United States Patent
Ishii

(12) 
(10) Patent No.: US 6,324,842 B1
(45) Date of Patent: Dec. 4, 2001

(54) AXLE DRIVING APPARATUS

(75) Inventor: Norihiro Ishii, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/671,998

(22) Filed: Sep. 29, 2000

Related U.S. Application Data

(62) Division of application No. 09/085,044, filed on May 27, 1998, now Pat. No. 6,199,380.

(30) Foreign Application Priority Data

| Jan. 20, 1998 | (JP) | 10-8967 |
| Jan. 20, 1998 | (JP) | 10-8968 |
| Jan. 20, 1998 | (JP) | 10-8969 |

(51) Int. Cl.[7] .............................. F16H 57/02; B01D 35/06
(52) U.S. Cl. ............................................ 60/454; 74/606 R
(58) Field of Search .................... 60/453, 455; 74/606 R

(56) References Cited

U.S. PATENT DOCUMENTS

| Re. 34,833 | 1/1995 | Hasegawa et al. . |
| 4,579,183 | 4/1986 | Irikura et al. . |
| 4,727,759 | 3/1988 | Yamaoka et al. . |
| 4,870,820 | 10/1989 | Nemoto . |
| 4,880,070 | 11/1989 | Irikura . |
| 4,905,472 | * 3/1990 | Okada ................................... 60/464 |
| 5,046,994 | 9/1991 | Hasegawa et al. . |
| 5,099,936 | 3/1992 | Irikura et al. . |
| 5,142,940 | 9/1992 | Hasegawa . |
| 5,367,877 | 11/1994 | Irikura . |
| 5,385,513 | 1/1995 | Ishii et al. . |
| 5,456,068 | 10/1995 | Ishii et al. . |
| 5,515,677 | * 5/1996 | Irikura ................................... 60/435 |
| 5,544,547 | 8/1996 | Ishimaru . |
| 5,701,739 | * 12/1997 | Ohashi et al. ......................... 60/453 |
| 5,755,098 | 5/1998 | Irikura . |
| 5,913,950 | 6/1999 | Matsufuji . |
| 6,186,028 | * 2/2001 | Shimizu ............................ 74/606 R |

* cited by examiner

*Primary Examiner*—John E. Ryznic
(74) *Attorney, Agent, or Firm*—Sterne, Kessler, Goldstein & Fox PLLC

(57) ABSTRACT

An axle driving apparatus including a housing which houses an input shaft having a longitudinal axis of rotation, axles having a lateral axis of rotation and a power-take-off shaft having a longitudinal axis of rotation. The housing may include a first housing member, a second housing member and a third housing member longitudinally joined with one another. A partition is disposed at a vertical center of the first and second housing members and divides the interior thereof into a first and a second chamber. A third chamber is formed between the second and third housing members. An hydrostatic transmission is disposed in the first chamber. A transmitting mechanism drivingly connecting the hydrostatic transmission with the axles is disposed in the second chamber. Another transmitting mechanism drivingly connecting the input shaft with the power-take-off shaft is disposed in the third chamber.

21 Claims, 21 Drawing Sheets

AXLE DRIVING APPARATUS

This application is a divisional of U.S. Appl. No. 09/085,044, filed May 27, 1998, now U.S. Pat. No. 6,199,380, which claims priority to Japan HEI 10–8967, Japan HEI 10–8968, and Japan HEI 10–8969, all filed Jan. 20, 1998.

BACKGROUND OF THE INVENTION

1. Field of the Invention

The present invention relates to an axle driving apparatus including a hydrostatic transmission (HST), axles and a transmitting mechanism transmitting power to the axles, all of which are integrally provided in a housing of the axle driving apparatus. A power take off (PTO) transmission system for driving four wheels of a vehicle is compactly included in the housing.

The axle driving apparatus of the present invention also relates to the placement of a filter for filtering supply oil for the HST, and to the placement of a reserve tank regulating the volume of oil which varies with an increase of temperature of the HST.

Furthermore, the axle driving apparatus of the present invention relates to a compact arrangement of a differential locking system, which prevents bending or tilting of a differential input gear under heavy loads.

2. Related Art

A conventional axle driving apparatus includes axles and a transmitting mechanism interconnecting an HST to the axles housed in a housing. For example, U.S. Pat. No. 5,456,068, discloses an axle driving apparatus wherein an input shaft, namely a pump shaft of an HST, is disposed vertically and an output shaft, namely a motor shaft of the HST, is disposed horizontally and parallel to the axles.

Conventionally, a PTO unit is attached to such an axle driving apparatus described above. U.S. Pat. Nos. 5,367,877 and 5,515,677, for example, disclose a PTO unit separate from an axle driving apparatus and attached to a rear surface of the axle driving apparatus, projecting from the rear of the axle driving apparatus.

In cases where the input shaft of the HST is disposed vertically, as in the above-mentioned patents, the housing is vertically shorter, however, it is longitudinally and laterally longer. The input shaft necessarily projects upward, thereby requiring a predetermined space for a pulley or a sprocket above the housing. In cases where the axle driving apparatus has a vertically disposed input shaft and a PTO shaft, directional control of the axle driving apparatus requires a gear train of bevel gears or similar means because the PTO shaft is necessarily disposed horizontally. Thus, a housing including such a gear train is large. Furthermore, a casing supporting the PTO shaft projects rearwardly thereby also requiring a large space.

In an operating oil circulation system of an HST housed in a conventional axle driving apparatus, an oil filter for filtering operating oil of the HST is located in a lower portion in the housing. A reserve tank is conventionally located in an upper portion of the housing or adjacent the axle driving apparatus via piping, whereby the reserve tank is distant from the oil filter.

Accordingly, the mounting structure of the reserve tank is separate from that of the oil filter. Also, when the oil filter needs to be removed due to clogging or periodic maintenance, it can be removed only after all the operating oil is drained from the housing. Thus, removing the oil filter is a time consuming, costly and complicated process.

Furthermore, conventional differential gearing of the transmitting mechanism interconnecting the HST with the axles housed in the housing is occasionally provided with a differential locking system to restrict rotation of the differential and enable the vehicle to easily travel on a soft field.

To lock the conventional differential gearing, a differential casing is locked with a differential input gear, a differential side gear and a differential pinion via pins or other suitable means. A conventional driving apparatus housing is large when a differential casing is also disposed in the housing along with the HST, the axles and the transmitting mechanism. However, if the differential locking system is not provided with a differential casing, the differential input gear lacks adequate strength and support in cases of heavy traction. In this case, the differential input gear generates eccentric forces due to partial engagement of teeth thereof thereby reducing durability of the differential gearing.

SUMMARY OF THE INVENTION

The first object of the present invention is to provide an axle driving apparatus including an input shaft having a longitudinal axis of rotation, axles having lateral axes of rotation, and a PTO shaft having a longitudinal axis of rotation housed in a housing, wherein a PTO transmission system is compactly housed in the housing.

To attain the first object, the housing includes at least two housing members which join each other in a longitudinal direction. One housing member houses an HST driven by the input shaft and a first transmitting mechanism transmitting the power output from the HST to the axles. The other housing member separately houses a second transmitting mechanism transmitting the power of the input shaft to the PTO shaft.

The housing also includes front (or first), middle (or second) and rear (or third) housing members joining one another in a longitudinal direction. First and second chambers are formed between the front and middle housing members. A third chamber is formed between the middle and rear housing members. An HST driven by the input shaft is disposed in one of the first and third chambers. The transmitting mechanism transmitting power from the HST to the axles is disposed in the second chamber. And the transmitting mechanism transmitting the power of the input shaft to the PTO shaft is disposed in the other of the first and third chambers.

The HST also includes a hydraulic pump connected with the input shaft, a hydraulic motor connected with the axles, and a center section supporting and fluidly interconnecting the hydraulic pump and the hydraulic. The axis of rotation of the hydraulic pump substantially coincides with that of the input shaft. The axis of rotation of the hydraulic motor is disposed substantially parallel to that of the axles. The hydraulic pump and motor are disposed above the axles such that the hydraulic pump is disposed between the hydraulic motor and the axles.

Furthermore, an axle housing is formed integrally with one of the housing members. A steering casing for four-wheel-drive applications is attached to an end of the axle housing.

Also, the PTO shaft is disposed adjacent to the axles, whereby the transmitting mechanism drivingly connecting the hydraulic motor with the axles overlaps the transmitting mechanism transmitting power of the input shaft to the PTO shaft when viewed from the side of the axle driving apparatus.

In one embodiment, the front, middle and rear housing members join each other in a longitudinal direction and the first, second and third chambers are formed in the housing. The other of the first and third chambers is fluidly connected with the second chamber, and one of the first and third chambers is fluidly connected with the second chamber through an oil filter.

Furthermore, the transmitting mechanism transmitting power to the PTO shaft includes an oil clutch capable of switching ON and OFF. The driving apparatus includes a charge pump driven by the input shaft to feed the oil clutch with operating oil. The oil discharged from the charge pump serves as operating oil for the HST. One of the housing members forms a recessed portion projecting into one of the first and third chambers. The oil clutch disposed in the other of the first and third chambers faces the inside of the recessed portion.

A second object of the present invention is to provide an axle driving apparatus including an input shaft having a longitudinal axis of rotation and axles having a lateral axes respectively housed in a housing which forms an oil sump therein. An oil filter and an HST are disposed in the oil sump to enable the HST to utilize oil filtered through the oil filter. The oil filter and a reserve tank are disposed to ease removal of the oil filter.

An opening sized to enable insertion and removal of the oil filter from the inside of the housing is formed at the upper portion of the housing and a cover means is provided for covering the opening. Also, the cover means includes a joint portion for mounting a reserve tank which regulates the volume of oil in the oil sump. An input port of the HST connected with the oil filter opens upwardly in the oil sink.

A third object of the present invention is to provide an axle driving apparatus having an HST, axles and a transmitting mechanism for the axles integrally in a housing of the axle driving apparatus, wherein a differential locking system is compactly disposed in the housing to prevent a differential input gear of the axle driving apparatus from bending or tilting during heavy tractional work.

A differential gear differentially connects inner ends of the left and right axles supported in the housing. The differential gearing includes a plurality of through-holes bored at regular intervals in the differential input gear to hold at least one of the inner ends of the axles. Bevel pinions are rotatably supported respectively in the through-holes perpendicular to the axes of axles. Differential side gears are disposed respectively on the left and right axles to engage the bevel pinions. A support member having a recessed portion for accommodating one of the differential side gears is provided on the axle. The support member includes a portion fixedly connected to the differential input gear and a portion rotatably supported by the housing. The differential input gear includes a main body having the through-holes and a gear portion that can be separably attached to the periphery of the main body. The support member includes an engaging projection for removably engaging the one of the differential side gears. The support member is not rotatable relative to the axis of the axle but it is slidable there along.

These and other objects of the invention will become more apparent from the detailed description which follows.

DETAILED DESCRIPTION OF THE PREFERRED EMBODIMENTS

With the above mentioned and other objects in view, the scope of the present invention includes the construction fully described below, illustrated in the accompanying drawings, and set forth in the appended claims, it being understood that various changes in the operation, form, proportion and minor details of construction, within the scope of the claims, may be modified without departing from the spirit of the present invention or sacrificing any of the advantages thereof.

Figure 1:
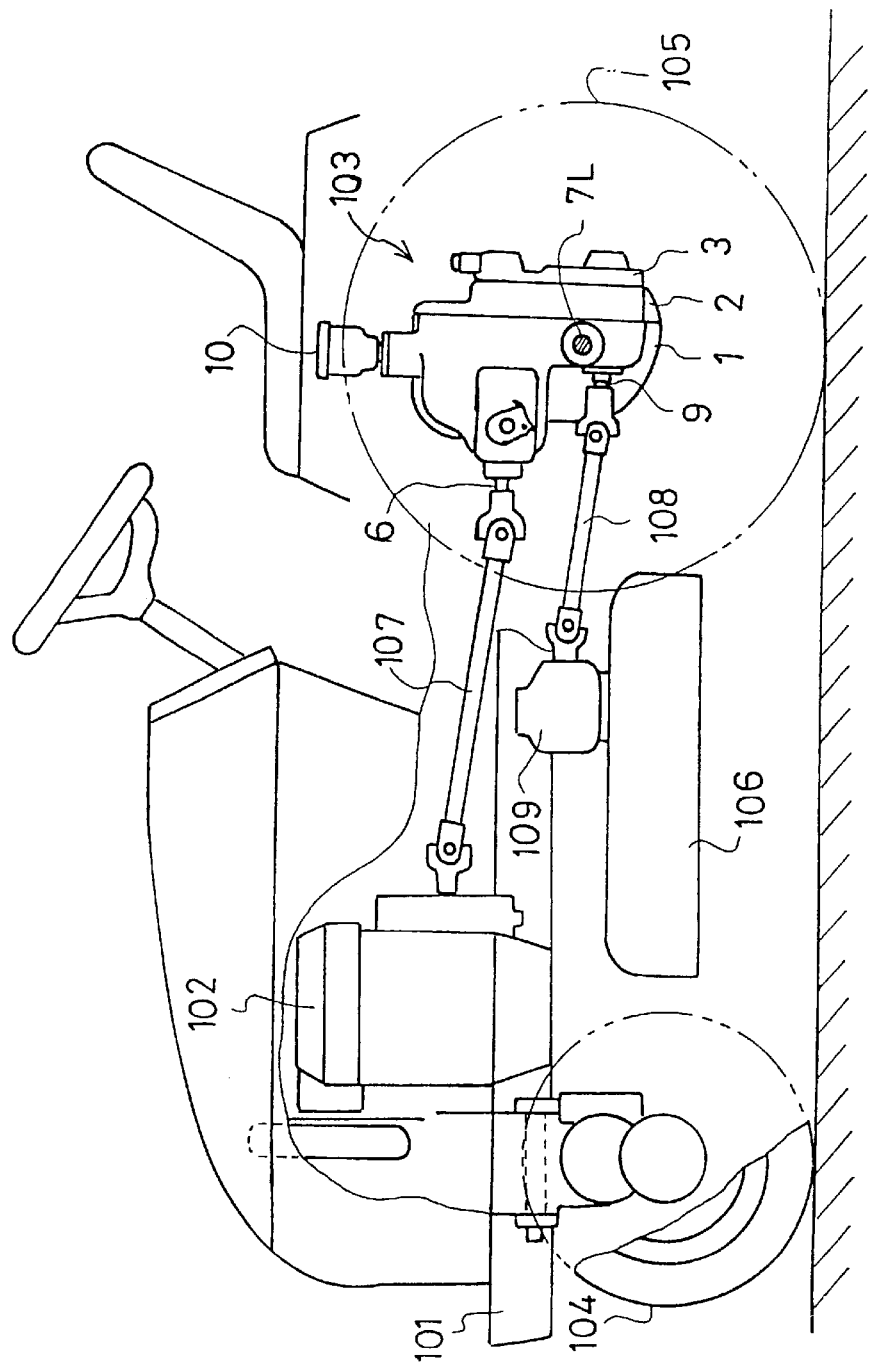
FIG. 1 is a side view of a lawn tractor provided with an axle driving apparatus of the present invention.

Explanation will be given of the entire construction of the lawn tractor provided with an axle driving apparatus 103 of the present invention with reference to FIGS. 1 and 3. An engine 102 is mounted on a front portion of a body frame 101. Left and right axle housings 1b of axle driving apparatus 103 are fixed respectively to left and right mounting stays 101a provided on a rear portion of body frame 101. Left and right rear wheels 105 are supported respectively on left and right axles 7L and 7R which project toward both lateral sides of the lawn tractor from axle driving apparatus 103. Left and right front wheels 104 are supported below a front portion of body frame 101. At the center portion of the vehicle body between front wheels 104 and rear wheels 105, a vertically movable mower 106 is attached as a mid-mount working machine. Driving power is transmitted from an output shaft of engine 102 to an input shaft 6 of axle driving apparatus 103 through universal joints and transmitting shaft 107 and thereby driving rear wheels 105. Axle driving apparatus 103 is provided at a lower portion thereof with a forwardly projecting mid-PTO (power-take-off) shaft 9 to transmit driving power to a gearbox 109 disposed on an upper portion of mower 106 through universal joints and transmitting shaft 108 and thereby driving mower 106.

Figure 2:
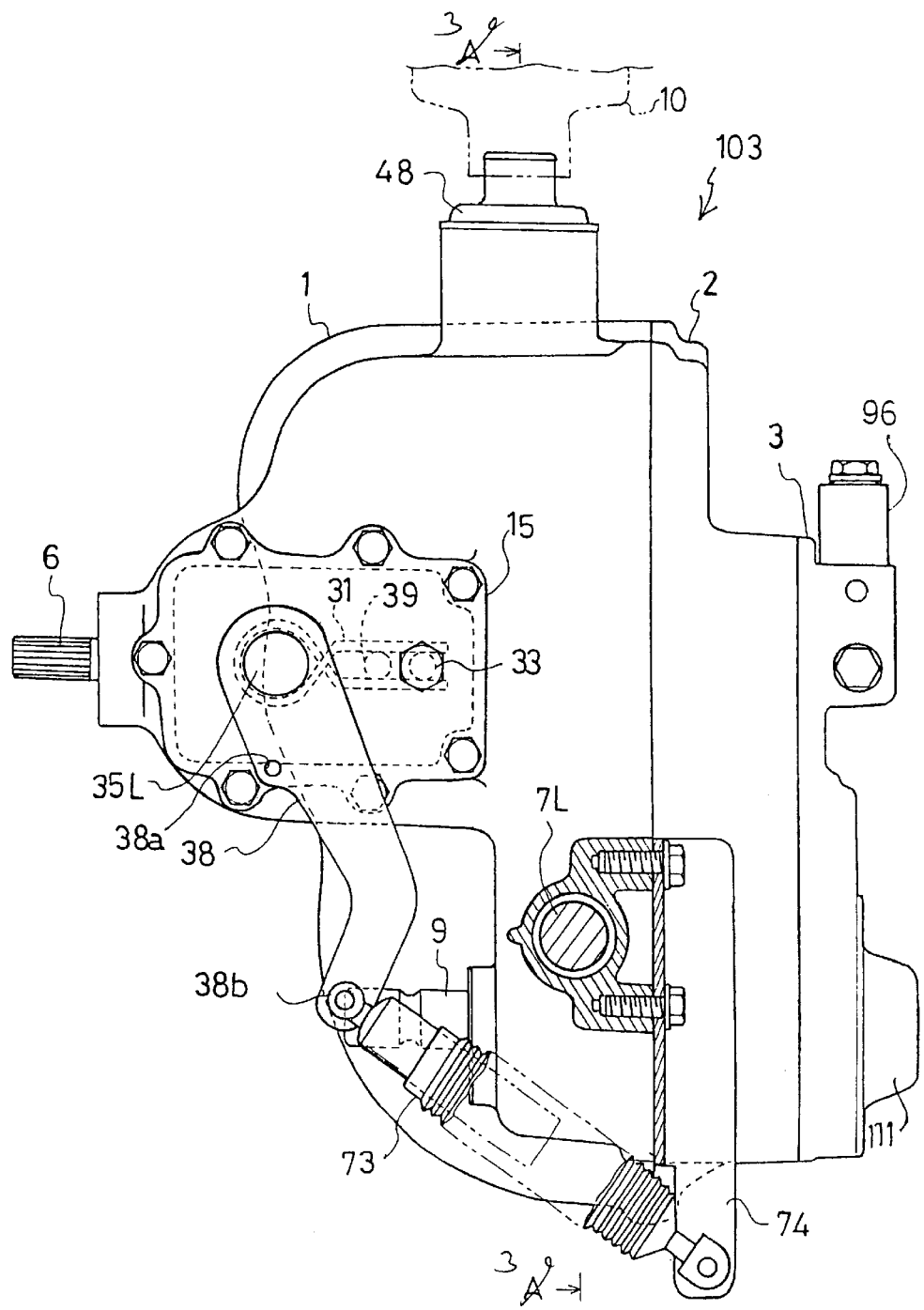
FIG. 2 is a side view of the axle driving apparatus.
Figure 3:
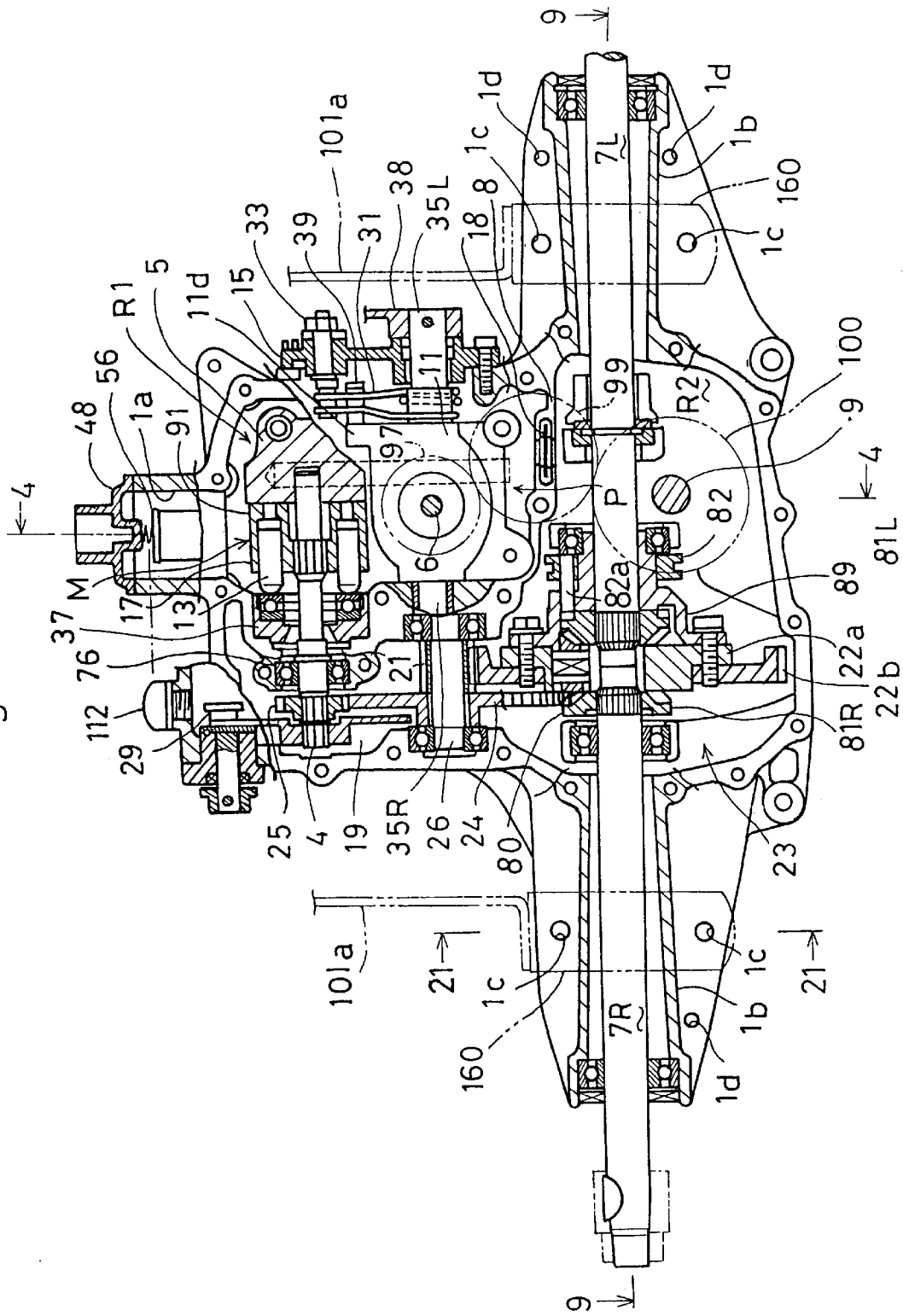
FIG. 3 is a sectional view taken along line 3—3 in FIG. 2.

Referring to FIGS. 2 and 3, a housing of axle driving apparatus 103 includes a front housing member 1, a middle housing member 2 and a rear housing member 3, which are separably joined to one another longitudinally with respect to the vehicle body. Each of housing members 1, 2 and 3 forms a laterally disposed joint surface, whereby the joint surfaces are joined with one another to form a single housing.

A laterally disposed motor shaft 4 is rotatably supported in an upper level portion of a space surrounded by front and middle housing members 1 and 2. An input or pump shaft 6, disposed perpendicularly to motor shaft 4, and a counter shaft 26, disposed parallel to motor shaft 4, are rotatably supported in a middle level portion of the front and middle housing members 1 and 2. Also, a lower level portion thereof rotatably and laterally supports left and right axles 7L and 7R and rotatably and longitudinally supports mid-PTO shaft 9. Input shaft 6 and mid-PTO shaft 9 project forwardly whereby power is transmitted from engine 102 to input shaft 6 and from mid-PTO shaft 9 to mower 106 through the above mentioned universal joints and driving shafts 107 and 108. This construction improves the efficiency of power transmission as compared to the conventional belt type transmission and reduces maintenance.

In order to support motor shaft 4 and counter shaft 26 on an inside surface of front housing member 1, an inside front wall of front housing member 1 includes a hemispherical recessed portion and a bearing member having a hemispherical convex similar to the recessed portion of front housing member 1 and removably attached to the recessed portion. The inside front wall of front housing member 1 receives axial ends of motor shaft 4 and counter shaft 26. A recessed portion 2b projects toward the interior of front housing member 1 from a partition 2a of middle housing member 2 and longitudinally separates the interior of middle housing member 2. Input shaft 6 is journalled between recessed portion 2b and front housing member 1.

Trunnion shafts 35L and 35R are rotatably and laterally supported in the middle level portion of front housing member 1. As discussed below, forwardly and eccentrically disposed bearings for axles 7L and 7R are disposed in the lower level portion of the housing in front of the joint surfaces of front and middle housing members 1 and 2 whereby axles 7L and 7R are rotatably supported in front housing member 1. The inner ends of axles 7L and 7R are differentially connected through a differential gearing 23. Both outer ends of axles 7L and 7R project outwardly from axle housings 1b which are integrally formed at the left and right outer walls of front housing member 1 to fixedly support rear wheels 105 respectively.

Between middle and rear housing members 2 and 3, a PTO clutch shaft 92 and a counter shaft 98 are rotatably and longitudinally supported as discussed below. Mid-PTO shaft 9 is rotatably supported through bearings at a rear portion thereof by partition 2a of middle housing member 2 and at the front portion thereof by a front wall of front housing member 1. The rear end portion of mid-PTO shaft 9 extends outwardly from rear housing member 3 and is covered with a cover 111.

Front housing member 1 and partition 2a of middle housing member 2 form a first chamber R1 for including a hydrostatic transmission (HST) and a second chamber R2 for including axles 7L and 7R (axles 7) and a transmitting mechanism for transmitting driving power from motor shaft 4 to differential gearing 23. First and second chambers R1 and R2 are substantially divided laterally by front housing member 1 and a partition 8 extending from partition 2a of middle housing member 2. Also, a third chamber R3 is formed between rear housing member 3 and partition 2a of middle housing member 2.

Figure 12:
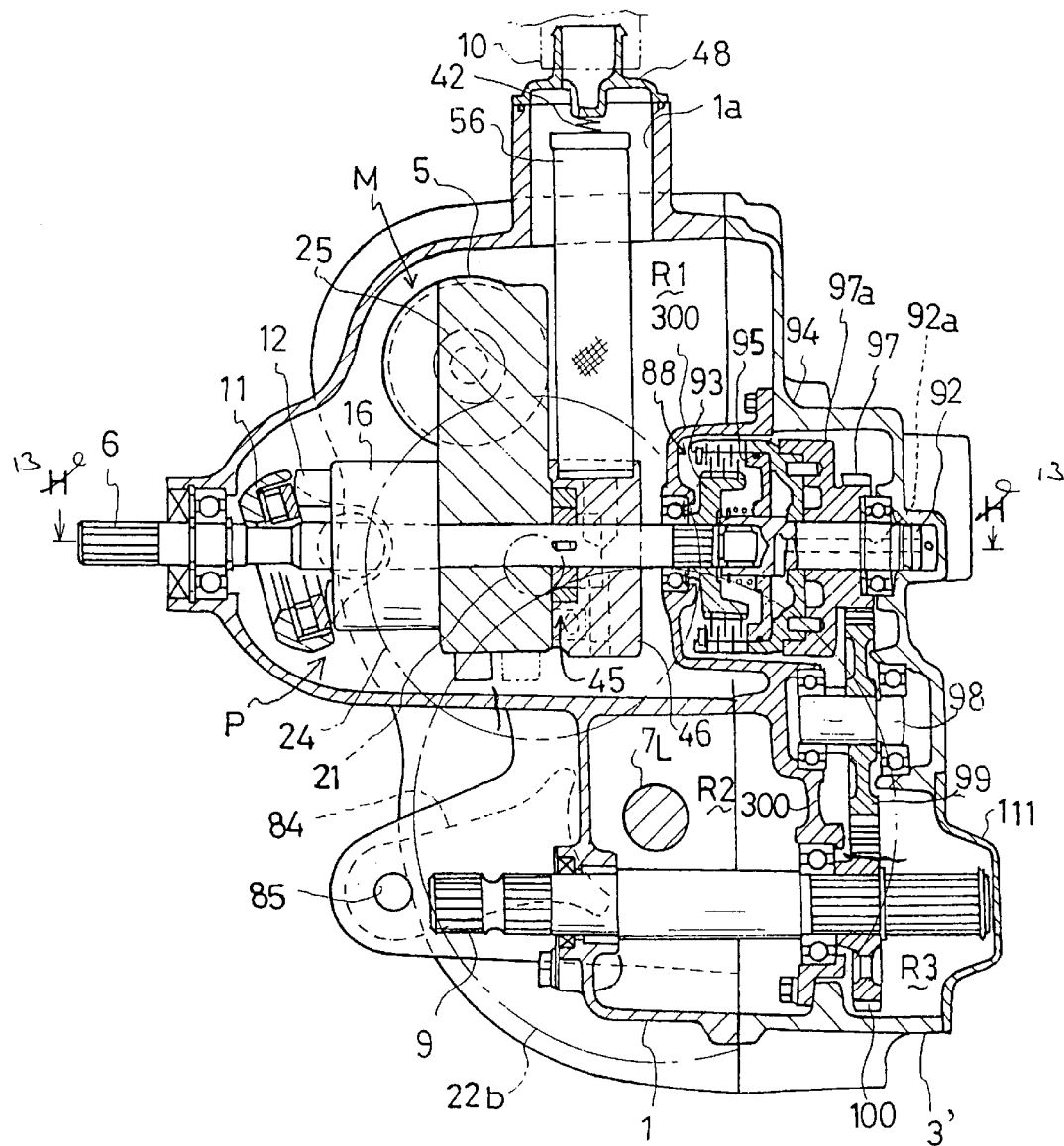
FIG. 12 is a sectional side view showing an alternative embodiment of the housing of the present invention.
Figure 13:
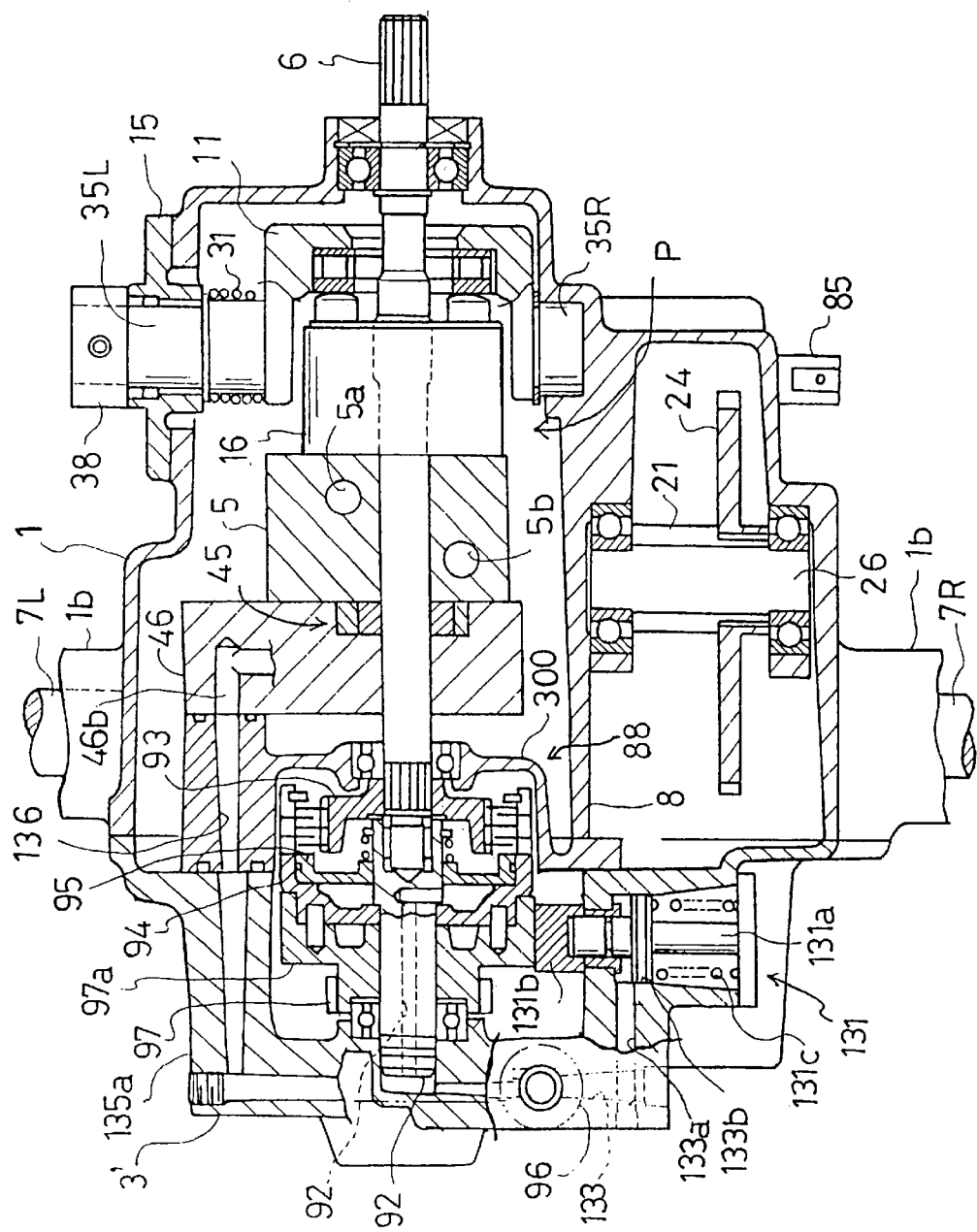
FIG. 13 is a sectional view taken along line 13—13 in FIG. 12.

Alternatively, the housing may include an integrally formed rear housing member 3' as shown in FIGS. 12 and 13, instead of middle and rear housing members 2 and 3 as shown in FIGS. 2. Housing member 3' joins, at a front opening edge thereof, with a rear opening edge of front housing member 1. In this case, third chamber R3 is formed between a rear wall 3a of rear housing member 3' and a bearing plate 300 provided at an inside surface of a front end of rear housing member 3'.

Figure 19:
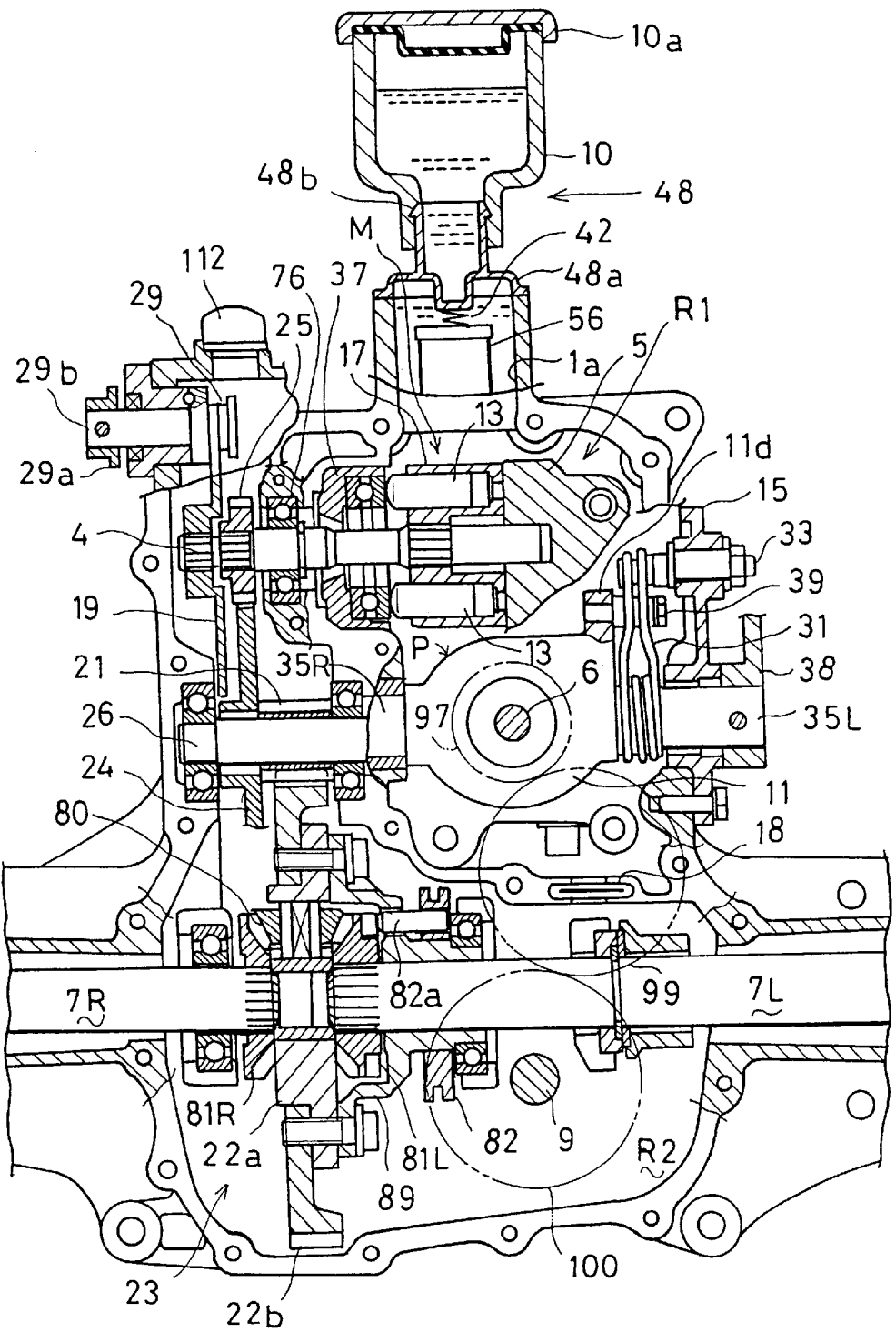
FIG. 19 is an enlarged view of FIG. 3.

First, second and third chambers R1, R2 and R3 form an oil sump filled with common lubricating oil. As shown in FIGS. 3 and 19, front housing member 1 is provided at the upper portion thereof with an opening 1a and an oil supply lid 112. Oil supply lid 112 is provided after assembling of axle driving apparatus 103 for supplying oil to second chamber R2. Opening 1a is large enough for insertion and removal of an oil filter 56, as discussed below. A reserve tank 10 is secured to opening 1a through a cover member 48. Reserve tank 10 communicates with first chamber R1 allowing air bubbles in front chamber R1 to enter reserve tank 10 thereby preventing airlock. Reserve tank 10 includes an upper lid 10a having a breather, whereby the volume of oil in first chamber R1 can be regulated in reserve tank 10. Oil filter 56 is disposed under reserve tank 10 as discussed below.

An oil filter 18 may be disposed on any portion of partition 8 dividing first and second chambers R1 and R2. In this embodiment, it is disposed between a portion of first chamber R1 including the HST and a portion of second chamber R2 including axle 7L and mid-PTO shaft 9, as shown in FIG. 3. Oil flowing from second chamber R2 to first chamber R1 is thereby purified. A flowing hole bored in middle housing member 2 enables oil to flow between second and third chambers R2 and R3. Accordingly, the oil in the housing simultaneously serves as operating oil for the HST and as lubricating oil for gears, bearings and the like. When oil enters from second chamber R2 to first chamber R1, foreign matter, such as friction dust of gears which may harm the HST, is filtered through oil filter 18.

Figure 5:
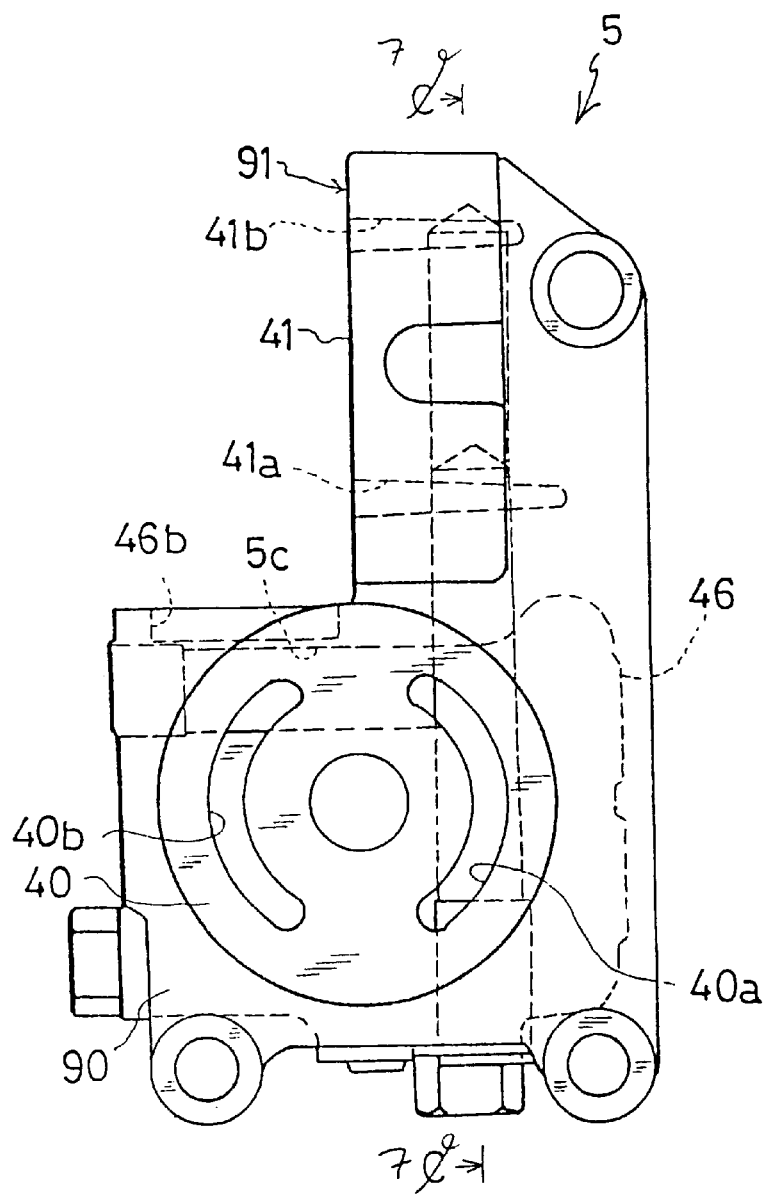
FIG. 5 is a front view of a center section of the present invention.
Figure 6:
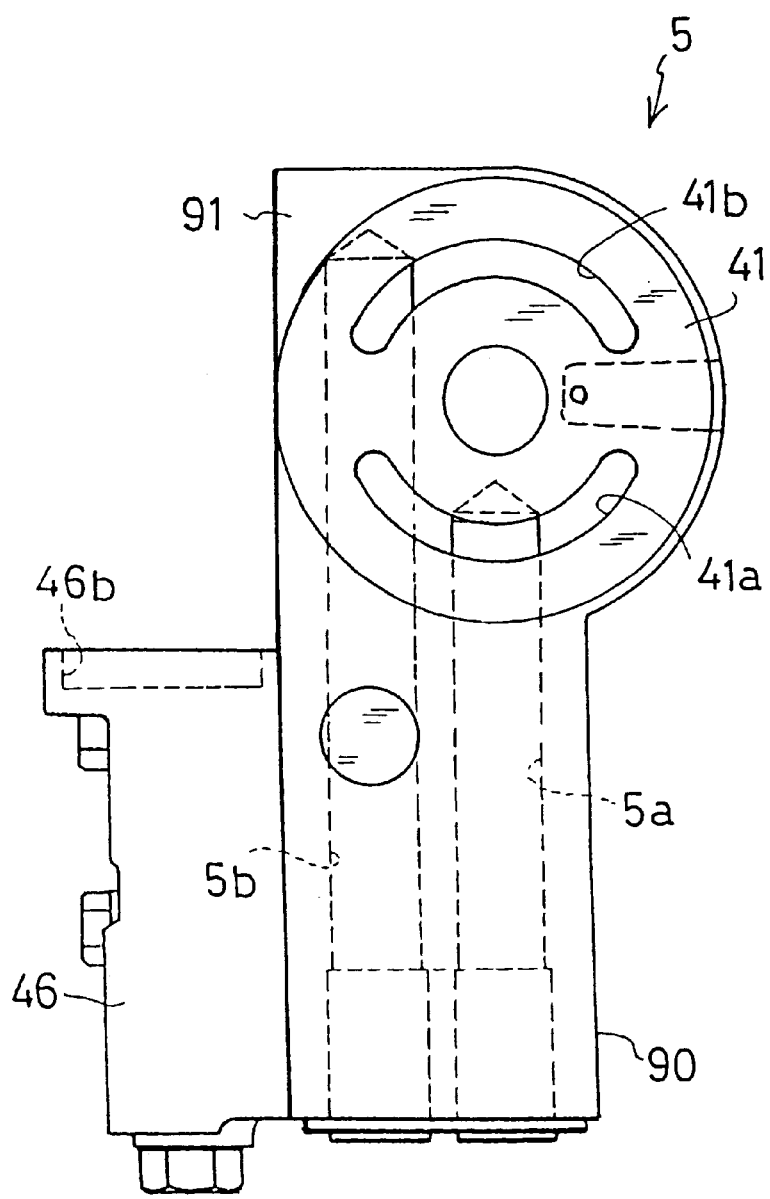
FIG. 6 is a side view of the center section in FIG. 5.
Figure 7:
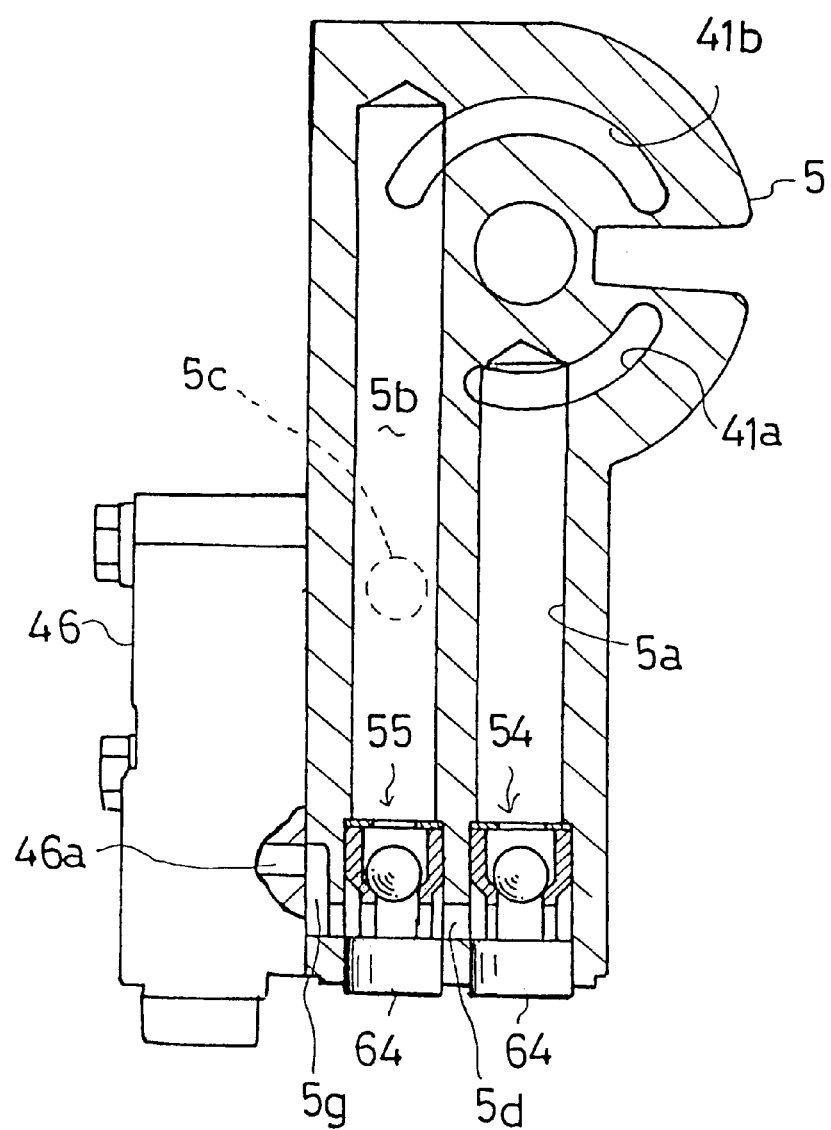
FIG. 7 is a sectional view taken along line 7—7 in FIG. 5.

The HST is located in first chamber R1. A slender center section 5 having a hydraulic pump P and a hydraulic motor M mounted thereon is fixed to front housing member 1. As shown in FIGS. 5, 6 and 7, in the case that center section 5 is fixed in first chamber R1, hydraulic motor M is mounted onto a left side surface (i.e., vertical surface) 91 of an upper portion of center section 5, and hydraulic pump P is mounted onto a front surface 90 of a lower portion of center section 5.

Hydraulic pump P and input shaft 6 are disposed between motor shaft 4 of hydraulic motor M and axles 7 and perpendicular to motor shaft 4 and axles 7. A cylinder block 16 of hydraulic pump P is rotatably and slidably mounted to a pump mounting surface 40 formed on front surface 90 of center section 5. Pistons 12 are reciprocally inserted into a plurality of cylindrical holes with biasing springs. A thrust bearing 11a of a movable swash plate 11 abuts against the heads of pistons 12. Input shaft 6 passes an opening 11b provided at the center of movable swash plate 11. Input shaft 6 and a pump shaft are disposed along the axis of rotation of cylinder block 16 and rotate with cylinder block 16. A front end of input shaft 6 projects outwardly from the front wall of front housing member 1 to receive driving power from engine 102 through a transmitting mechanism having the universal joints and transmitting shaft 107.

The amount and direction of oil discharged from hydraulic pump P can be changed when the piston abutting surface of movable swash plate 11 is tilted relative to the axis of rotation of cylinder block 16. As shown in FIG. 3, trunnion shafts 35L and 35R integrally project from both sides of movable swash plate 11 and are disposed parallel to axles 7. Trunnion shaft 35R is rotatably supported by partition 8, and trunnion shaft 35L is rotatably supported by a lid member 15 which covers an opening at a side surface of front housing member 1. Movable swash plate 11 can be tilted around trunnion shafts 35L and 35R. The output power of hydraulic motor M can be changed according to the tilting operation of movable swash plate 11.

Trunnion shaft 35L extends outwardly through lid member 15 and a control lever 38 is fixedly disposed on the extended portion of trunnion shaft 35L. Control lever 38 is connected with a speed control means adjacent to a driver's seat of the vehicle through a rod or a wire (not shown). The rod or wire is joined to a hole 38a. Control lever 38 rotates longitudinally of the vehicle body thereby simplifying the link mechanism. A coiling neutral return spring 31 is wound around trunnion shaft 35L in the housing. Both ends of neutral return spring 31 are crossed and extend rearward sandwiching engaging pin 39 and an eccentric shaft 33. Engaging pin 39 projects rearwardly from an arm 11d of movable swash plate 11. Eccentric shaft 33 is attached to lid member 15.

Accordingly, when control lever 38 is rotated to change the speed of the vehicle, arm 11d rotates therewith around trunnion shafts 35 whereby one end of neutral return spring 31 is pushed by engaging pin 39 and the other is retained by eccentric shaft 33, thereby biasing control lever 38 to return to the neutral position thereof. When the operating force on the speed control means is released, engaging pin 39 is returned toward eccentric shaft 33 and retained at the neutral position thereof. The portion of eccentric shaft 33 projecting outwardly from the housing is formed by a screw for adjustment thereof. Eccentric shaft 33 may be adjusted to bias arm 11d around trunnion shaft 35L by neutral return spring 31 whereby movable swash plate 11 can be adjusted to be retained at an accurate neutral position.

As shown in FIG. 2, control lever 38 disposed on the end of trunnion shaft 35L projects outwardly from the housing and includes engaging portion 38b.

Engaging portion 38b projects downwardly and is joined with a movable portion of a shock absorber 73. Shock absorber 73 is disposed slanting forwardly below axle 7L. A fixed portion of shock absorber 73 is joined with a support plate 74 fixed onto the lower portion of middle housing member 2. Thus, shock absorber 73 is connected with control lever 38, so as to prevent the vehicle from rapid speed changing and from rapid deceleration when releasing operation of the operating tool caused by rapid neutral return of control lever 38 biased by neutral return spring 31.

The pressure oil discharged from hydraulic pump P is sent to hydraulic motor M through oil passages within center section 5. As shown in FIG. 3, hydraulic motor M includes a cylinder block 17 rotatably supported on a motor mounting surface 41 which is formed on vertical surface 91 of center section 5. A plurality of pistons 13 are reciprocally inserted into a plurality of cylindrical bores of cylinder block 17 with biasing springs. The heads of pistons 13 abut against a fixed swash plate 37. Fixed swash plate 37 is fixedly retained in a partition 8 of front housing member 1.

Motor shaft 4 is horizontally disposed along the axis of rotation of cylinder block 17 and rotates integrally therewith. One end of motor shaft 4 is supported by a bearing hole provided at the center of motor mounting surface 41 of center section 5. The other end of motor shaft 4 is inserted into second chamber R2 through partition 8 and is rotatably supported on partition 8 by a bearing 76. Bearing 76 includes seals to divide first and second chambers R1 and R2. A gear 25 and an adjacent brake disc 19 are fixed on the end portion of motor shaft 4 disposed in second chamber R2. Brake disc 19 presses a brake pad 29 when a brake shaft 29b is rotated by operation of brake arm 29a to brake motor shaft 4.

The inner construction of center section 5 on which hydraulic pump P and motor M is shown in FIGS. 5, 6 and 7. The center of pump mounting surface 40 of center section 5 provides a bearing portion for rotatably supporting the rear portion of input shaft 6. A pair of arcuate ports 40a and 40b are vertically oriented around the bearing portion thereof to allow oil to enter into and exit from cylinder block 16. Also, as shown in FIG. 6, a pair of arcuate ports 41a and 41b are longitudinally oriented allowing oil to be drawn into and discharged from cylinder block 17.

A first straight oil passage 5a and a second straight oil passage 5b are upwardly bored within center section 5 and are longitudinally parallel to each other. Oil passages 5a and 5b connect arcuate ports 40a and 40b of pump mounting surface 40 with arcuate ports 41a and 41b of motor mounting surface 41 respectively. An intermediate portion of second straight oil passage 5b is perpendicularly joined to a third straight oil passage 5c which extends from a side portion thereof. Such construction provides a closed fluid circuit for circulation of operating oil between hydraulic pump P and motor M.

Arcuate port 40a of pump mounting surface 40 is connected directly with first straight oil passage 5a. Arcuate port 40b is connected with third straight oil passage 5c. Arcuate port 41a of motor mounting surface 41 is connected directly with first straight oil passage 5a, and arcuate port 41b thereof is connected with second straight oil passage 5b. Thus, first, second and third straight oil passages 5a, 5b and 5c, which communicate arcuate ports 40a and 40b with arcuate ports 41a and 41b respectively, construct the closed fluid circuit.

The openings of first and second straight oil passages 5a and 5b are provided with check valves 54 and 55 respectively and closed by plugs 64. An oil passage 5d fluidly communicates entrance ports of check valves 54 and 55, and is connected with a supply port 5g opening at a rear surface of center section 5.

A charge pump case 46 including a trochoid type charge pump 45 is fixedly mounted onto the rear surface of center section 5. Input shaft 6 extends into charge pump case 46 to drive charge pump 45. Charge pump 45 may be either an inner gear type or an outer gear type charge pump.

Figure 8:
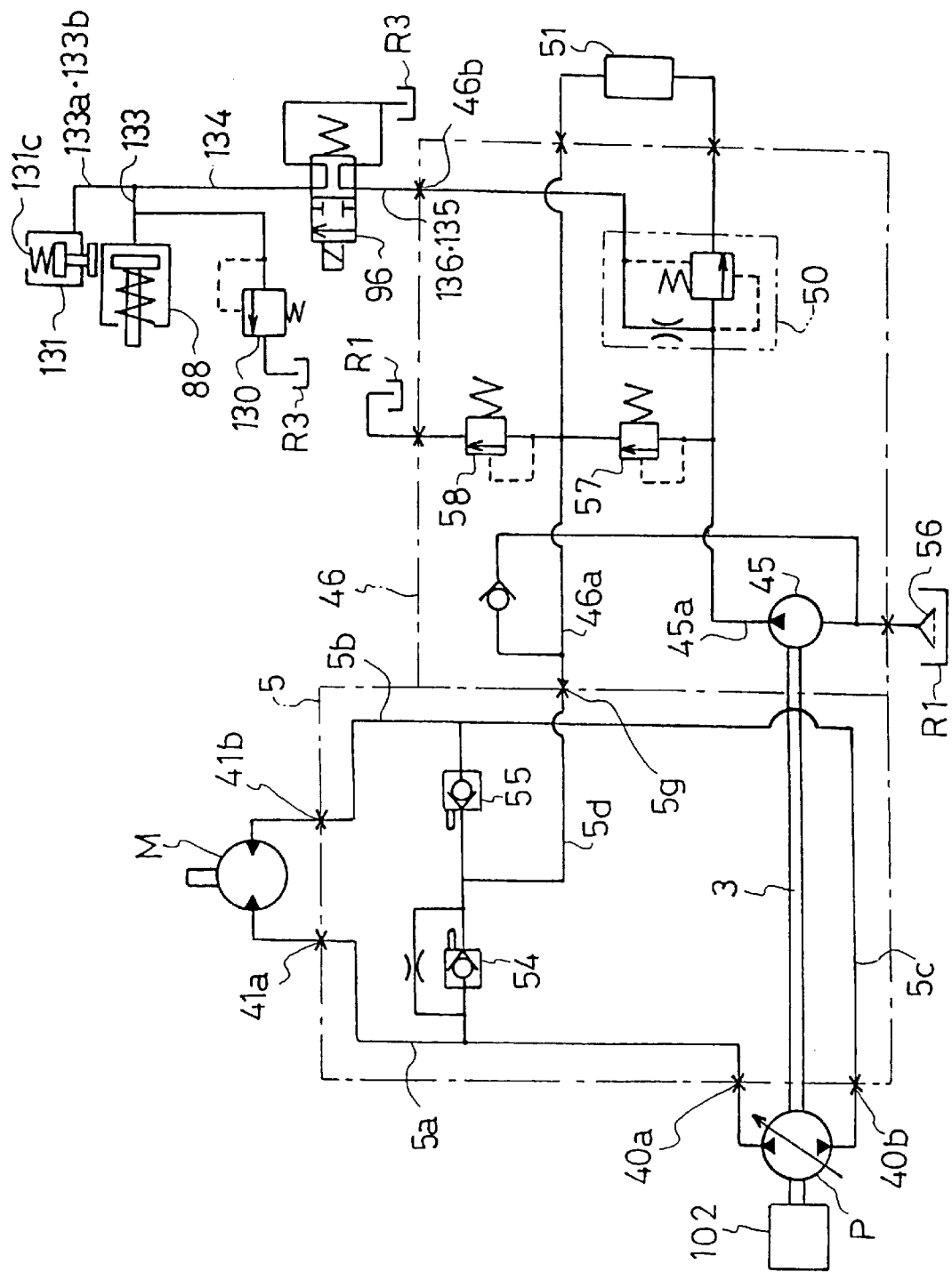
FIG. 8 is a hydraulic circuit diagram of the present invention.

As shown in FIGS. 7 and 8, when charge pump case 46 is mounted onto the rear surface of center section 5, supply port 5g is connected with a charge oil passage 46a bored within charge pump case 46. Supply port 5g is also connected with a discharge port 45a of charge pump 45 through a main relief valve 57. Pressure oil from charge pump 45, which is oil drained from main relief valve 57, is supplied as operating oil into the closed fluid circuit of the HST via charge oil passage 46a, supply port 5g, oil passage 5d and check valves 54 and 55. A reference numeral 58 designates a relief valve for setting the pressure of supply oil.

Figure 10:
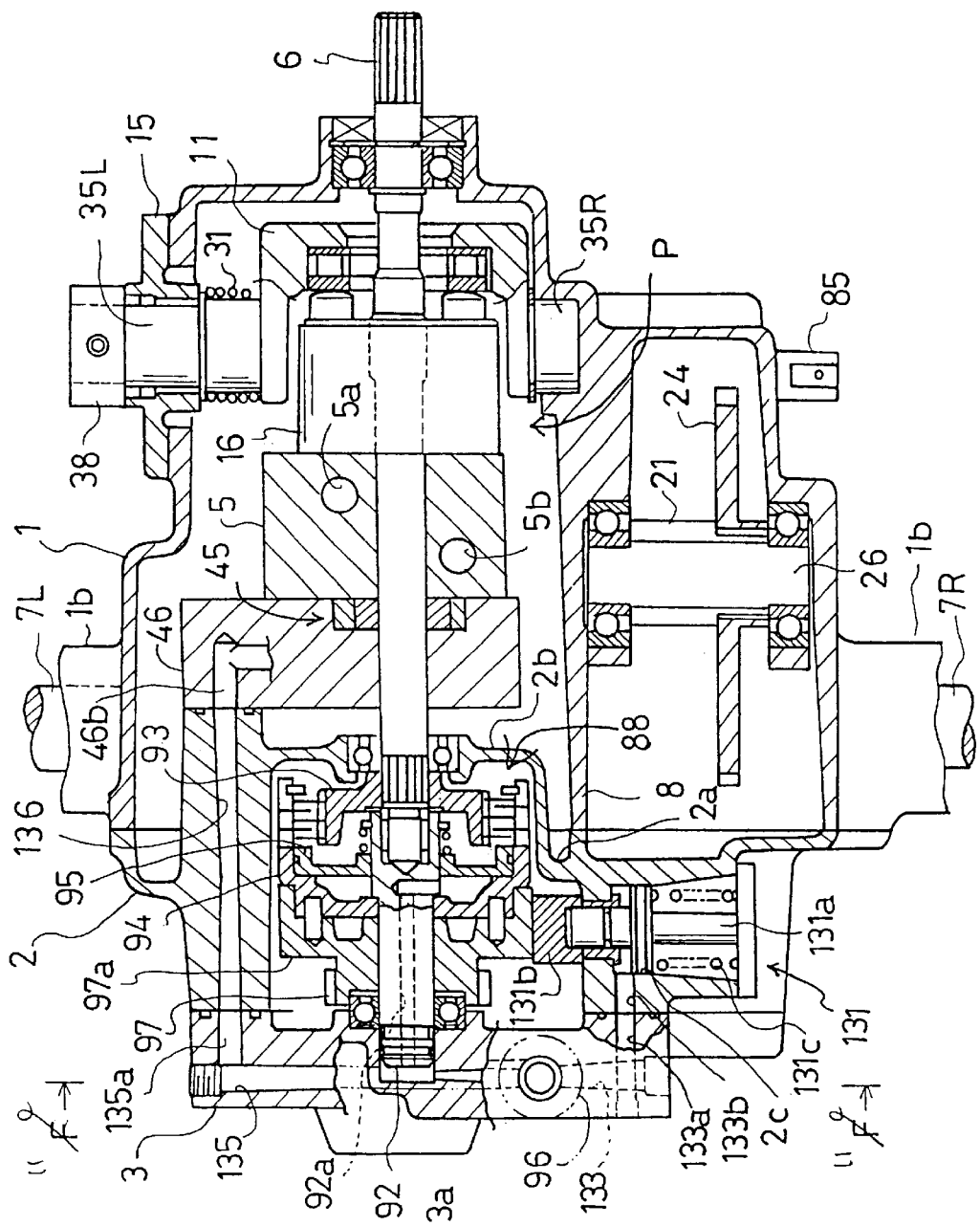
FIG. 10 is a sectional view taken along line 10—10 in FIG. 4.

A flow control valve 50 is connected with discharge port 45a to divide the oil discharged from charge pump 45 into two directed oil flows. As shown in FIG. 10, one oil flow is discharged from an oil output port 46b opening at the rear surface of charge pump case 46, the other oil flow is flows out from the housing, 25 to drive an outer actuator 51. The returning oil from outer actuator 51 flows through back through oil passage 46a within charge pump case 46.

Opening 46b opens upwardly toward the upper wall of front housing member 1 and engages a lower end of oil filter 56, which is inserted into front housing member 1 through opening 1a of an upper wall thereof. An upper end of oil filter 56 is biased away from a cover member 48 by a spring 42. Accordingly, oil filter 56 is sandwiched between cover member 48 and charge pump case 46.

Reserve tank 10 is fixedly connected with an upper portion of cover member 48.

Operating oil is present in first chamber R1 is rather pure and contains little foreign matter. This rather pure operating oil is drawn into charge pump 45 thereby reducing maintenance of oil filter 56 and improving the durability of HST.

During maintenance of oil filter 56, the seat of the vehicle is tilted backwardly to expose reserve tank 56. This allows easy removal of reserve tank 10, cover member 48 and oil filter 56 upwardly through opening 1a.

Cover member 48 includes a mounting flange 48a covering opening 1a and a tubal connecting portion 48b supporting reserve tank 10. The level of oil in first chamber R1, in which oil filter 56 is positioned, is indicated in reserve tank 10. When the oil in first chamber R1 swells or shrinks according to the driving condition of HST, the oil level in reserve tank 10 moves vertically through opening 1a and connecting portion 48b of cover member 48 to regulate the volume of oil in first chamber R1.

One of ordinary skill in the art would recognize that hydraulic pump P may be disposed above hydraulic motor M. In this case, oil filter 56 would be vertically shorter and more compact, thereby further reducing cost and promoting ease of engagement with opening portion 46b.

A bypass operating lever (not shown) for communicating first and second straight oil passages 5a and 5b to the oil sump is disposed ahead of a front wall of front housing member 1, thereby allowing the axles to rotate when the vehicle is towed. Rotation of the bypass operating lever rotates a bypass operating lever shaft supported by the front wall of front housing member 1. A flat lower end surface of the bypass operating lever pushes a push-pin supported by center section 5 toward cylinder block 17, thereby producing a gap between motor mounting surface 41 and cylinder block 17. Thus, first and second straight oil passages 5a and 5b are fluidly communicated with the oil sump within the housing through arcuate ports 41a and 41b, thereby allowing motor shaft 4 to freely rotate.

Next, explanation will be given on a gear-type power transmitting mechanism which transmits driving power from motor shaft 4 to differential gearing 23. As shown in FIG. 3, a gear 25 is provided on a portion of motor shaft 4 projecting into second chamber R2 engages a large diametric gear 24 fixed on a counter shaft 26. A small diametric gear 21 is fixed on counter shaft 26 and engages a differential input gear 22 of differential gearing 23. Differential gearing 23 is driven by decelerated differential input gear 22 receiving the driving power from motor shaft 4. Large diametric gear 24 on counter shaft 26 is disposed to one side of differential input gear 22 overlapping differential input gear 22 and thereby shortens the lateral width of the apparatus.

Figure 20:
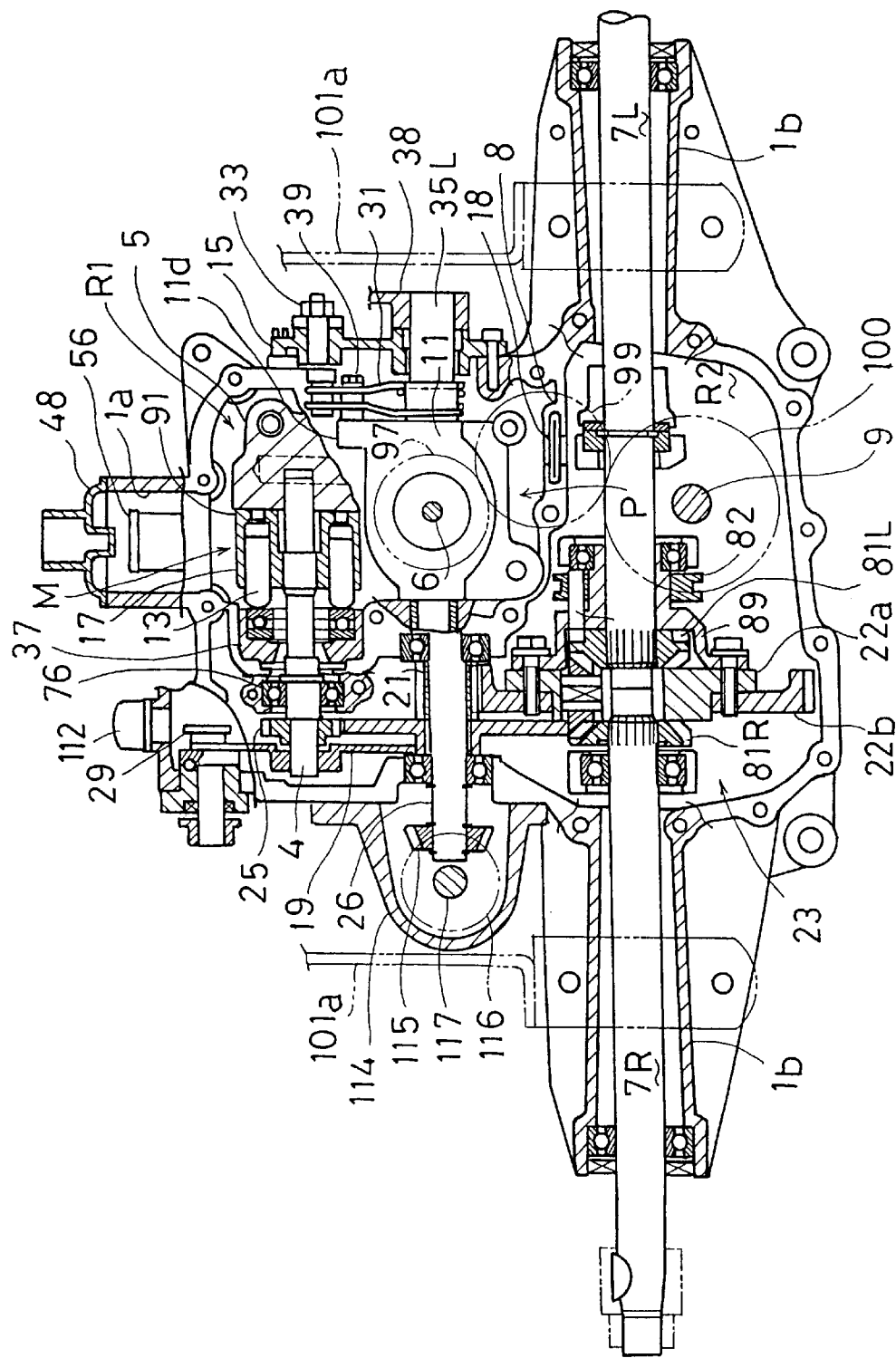
FIG. 20 is a front view of the axle driving apparatus including a front wheel driving PTO gearcase attached thereto.
Figure 21:
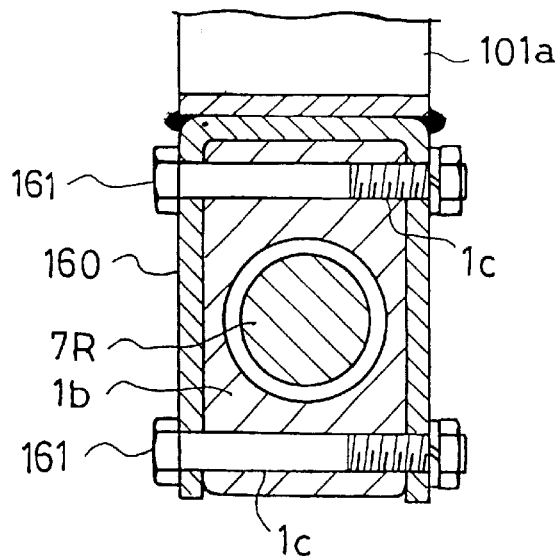
FIG. 21 is a sectional view taken along line 21—21 in FIG. 3.

Motor shaft 4 and counter shaft 26 may also drive front wheels 104. For example, front housing member 1 is bored at a side portion thereof for engagement with a power take off gearbox 114, as shown in FIG. 20. One end portion of counter shaft 26' projects into power take off gearbox 114. A bevel gear 115 is fixed to the end portion of counter shaft 26'. A front wheel driving shaft 117 is rotatably and longitudinally disposed within power take off gearbox 114. A bevel gear 116 fixed to front wheel driving shaft 117 engages bevel gear 115. Driving power, which is transmitted from counter shaft 26' to front wheel driving shaft 117 is further transmitted to front wheels 104 through universal joints, a driving shaft and the like. A power clutching mechanism, such as an oil clutch, is disposed in either the power take off gearbox 114 or a front axle case. The power clutching mechanism enables the vehicle to choose between four-wheel-drive and two-wheel-drive.

Figure 9:
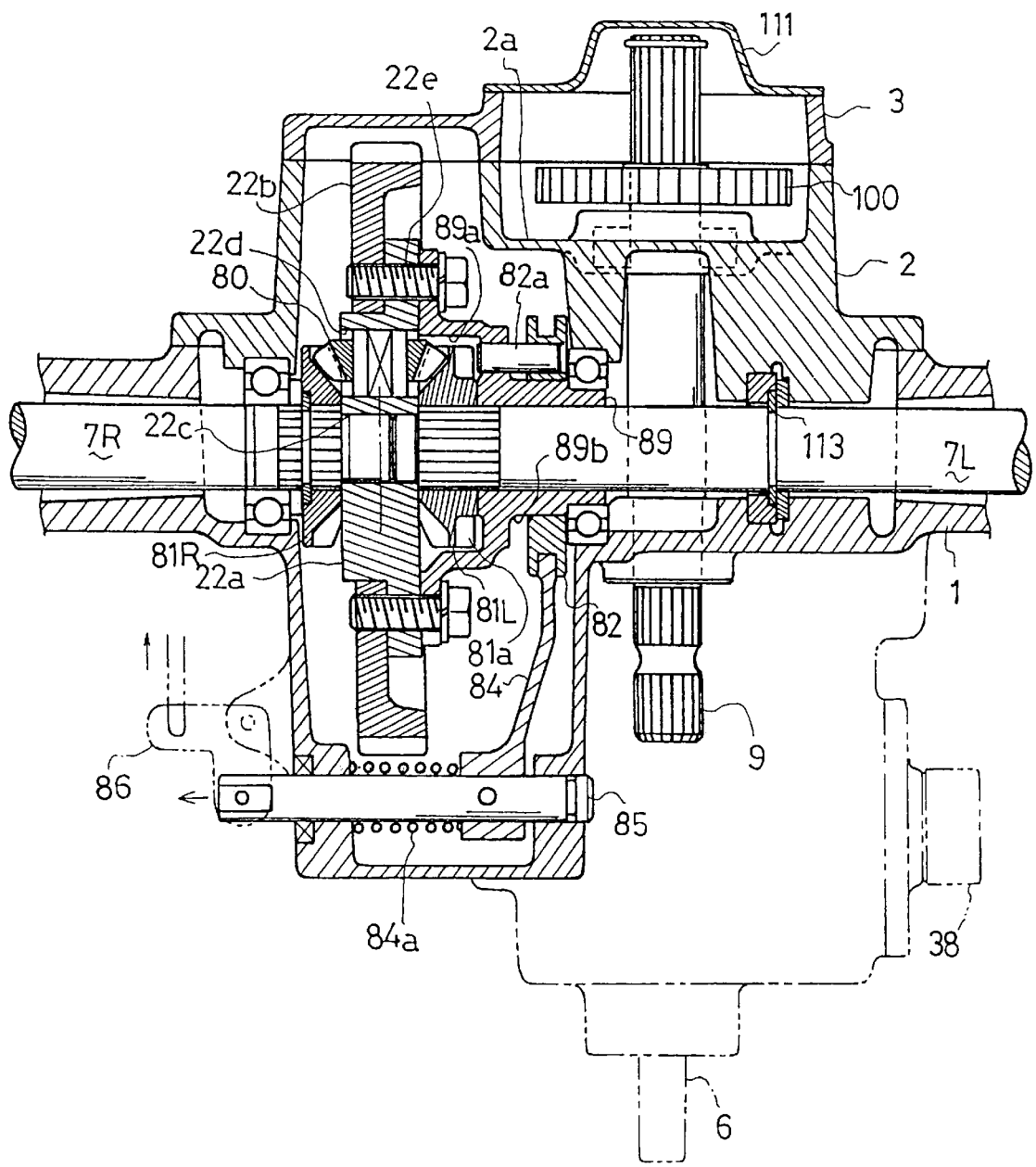
FIG. 9 is a sectional view taken along line 9—9 in FIG. 3.

As shown in FIG. 9, the differential input gear 22 of differential gearing 23, which transmits driving power to left and right axles 7L and 7R, includes a main body 22a and a ring-shaped gear portion 22b. Main body 22a includes a central axial boring 22c for supporting each facing end of axles 7L and 7R inserted thereinto. Main body 22a further includes a pair of through-holes 22d bored opposite both sides of axial boring 22c, into which a pair of differential pinions 80 is respectively inserted. A plurality of bolt holes 22e are bored about a periphery of main body 22a for fixing a gearing portion 22b to main body 22a through bolts. Main body 22a and gear portion 22b can be easily separated by removal of the bolts. Main body 22a is sintered alloy or the like, and gear portion 22b is machined or forged steel.

The inner ends of axles 7L and 7R are spline-fitted respectively to differential side gears 81L and 81R. As shown in FIG. 9, bowl-shaped support member 89 is engaged on a side of axle 7L which is opposite the reduction gearing (to the right side when looking in the forward traveling direction). Differential side gear 81L is disposed in a recessed portion 89a of support member 89. An opening edge of support member 89 forms an attaching flange surface which, together with main body 22a, is fixed to gear portion 22b through bolts. A periphery of a boss portion 89b of support member 89 slidably engages an axial slider 82. Slider 82 includes an engaging projection 82a. Engaging projection 82a may include a pin disposed parallel to axles 7. An end of engaging projection 82a passes through support member 89 and is disposed in recessed portion 89a. Engaging projection 82a selectively engages a recessed portion 81a which is formed at the periphery of the back surface of differential side gear 81L. Thus, a differential locking system is constructed between support member 89 and differential side gear 81L. Differential gearing 23 does not include a differential casing, however, it is partially covered by support member 89.

A front portion of right axle 7R is rotatably supported by front housing member 1 by bearings. An inside portion of left axle 7L is rotatably supported in front housing member 1 by a bearing disposed about the periphery of support member 89. The inner end portion of right axle 7R which is supported in axial bore 22c of main body 22a is longer than the inner end portion of left axle 7L supported bore 22c. When differential input gear 22 receives a laterally directed force, one side thereof is supported by support member 89 and the other is supported between main body 22a and axle 7R. The possibility of misalignment of differential input gear 22 is thereby reduced. A retaining ring 113 engages an intermediate portion of axle 7L to prevent axial displacement thereof.

A slide fork 84 engages' slider 82. A basic portion of slide fork 84 is fixed to a shifter shaft 85 which is supported at both ends thereof by front housing member 1. Shifter shaft 85 is parallel to axles 7. One end of shifter shaft 85 projects outwardly from front housing member 1 and engages with one end of a bell crank arm 86. The other end of bell crank arm 86 is interconnected with a brake device and a differential control means, such as a differential locking pedal, by a linkage.

Operation of the differential control means rotates bell crank arm 86 in the direction of the arrow shown in FIG. 9. Slide fork 84 and slider 82 simultaneously slide leftwardly whereby projection 82a engages recessed portion 81a of differential side gear 81. Thus, when a brake pedal is activated, the brake device is applied and left and right axles 7L and 7R are simultaneously locked together by the differential locking system thereby simultaneously stopping both rear wheels 105 and preventing wheel slip. The linkage may be of a simple construction because bell crank arm 86 and brake arm 29a are disposed on the same side of front housing member 1.

For supporting the outer end portions of axles 7L and 7R, axle housings 1b project leftward and rightward from both side walls of front housing member 1. Upper and lower portions of each axle housing 1b includes a pair of horizontally and longitudinally oriented attaching holes 1c and a pair of attaching holes 1d. An attaching plate 160 engages a portion of attaching holes 1c and is fixed to front housing member 1 with bolts 161. Attaching plate 160 has a reverse U-shape when viewed from one side. An attaching bracket 101a is fixed to an upper surface of attaching plate 160 by welding or the like. Attaching bracket 101a has a L-shape when viewed from the front. Each attaching plate 160 is fixed to body frame 101 to support axle driving apparatus 103.

Figure 22:
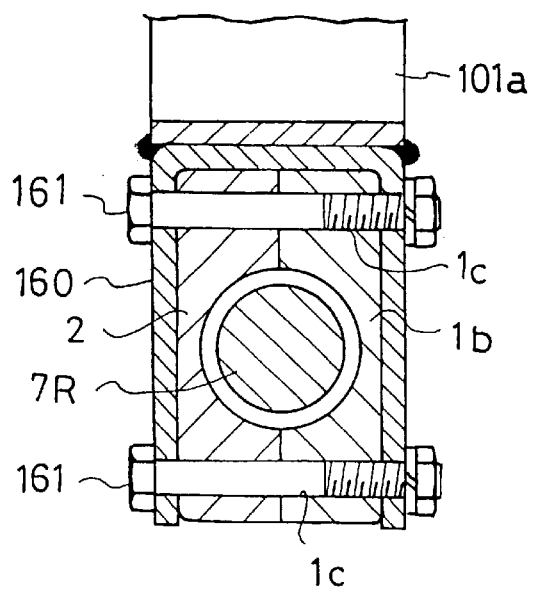
FIG. 22 is a sectional side view showing an alternative embodiment including a longitudinally separable axle housing.

In the embodiment of the present invention shown in FIG. 22, axle housings 1b include front housing member 1 and middle housing member 2 joined by joint surfaces coincident with the axis of axles 7. In this embodiment, both axle housings include attaching holes and are fixed together by attaching plates 160 and bolts 161. Wheel brakes (not shown) may be attached through attaching holes 1d.

Figure 14:
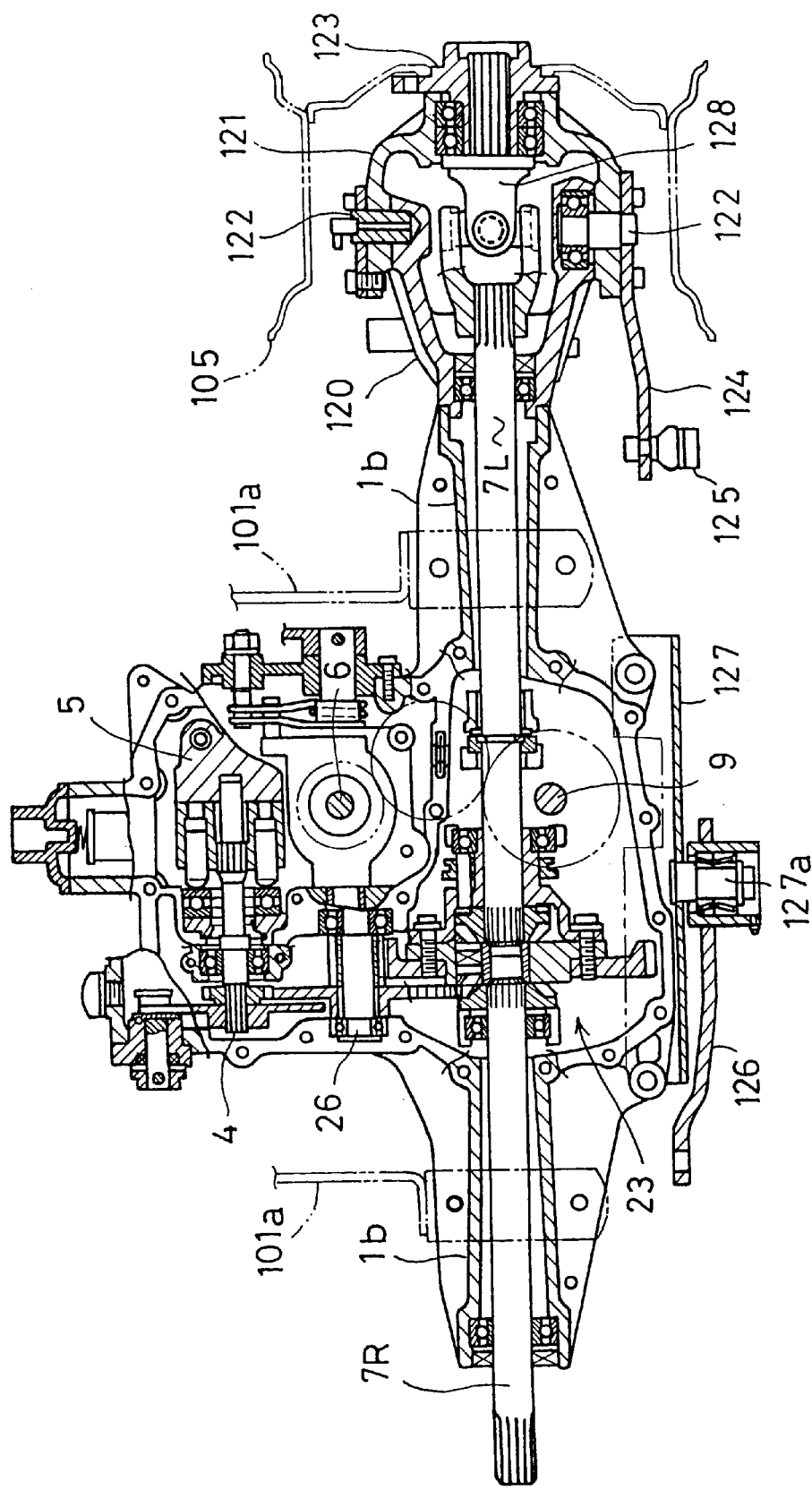
FIG. 14 is a sectional front view of a four-wheel-steering axle driving apparatus of the present invention.
Figure 15:
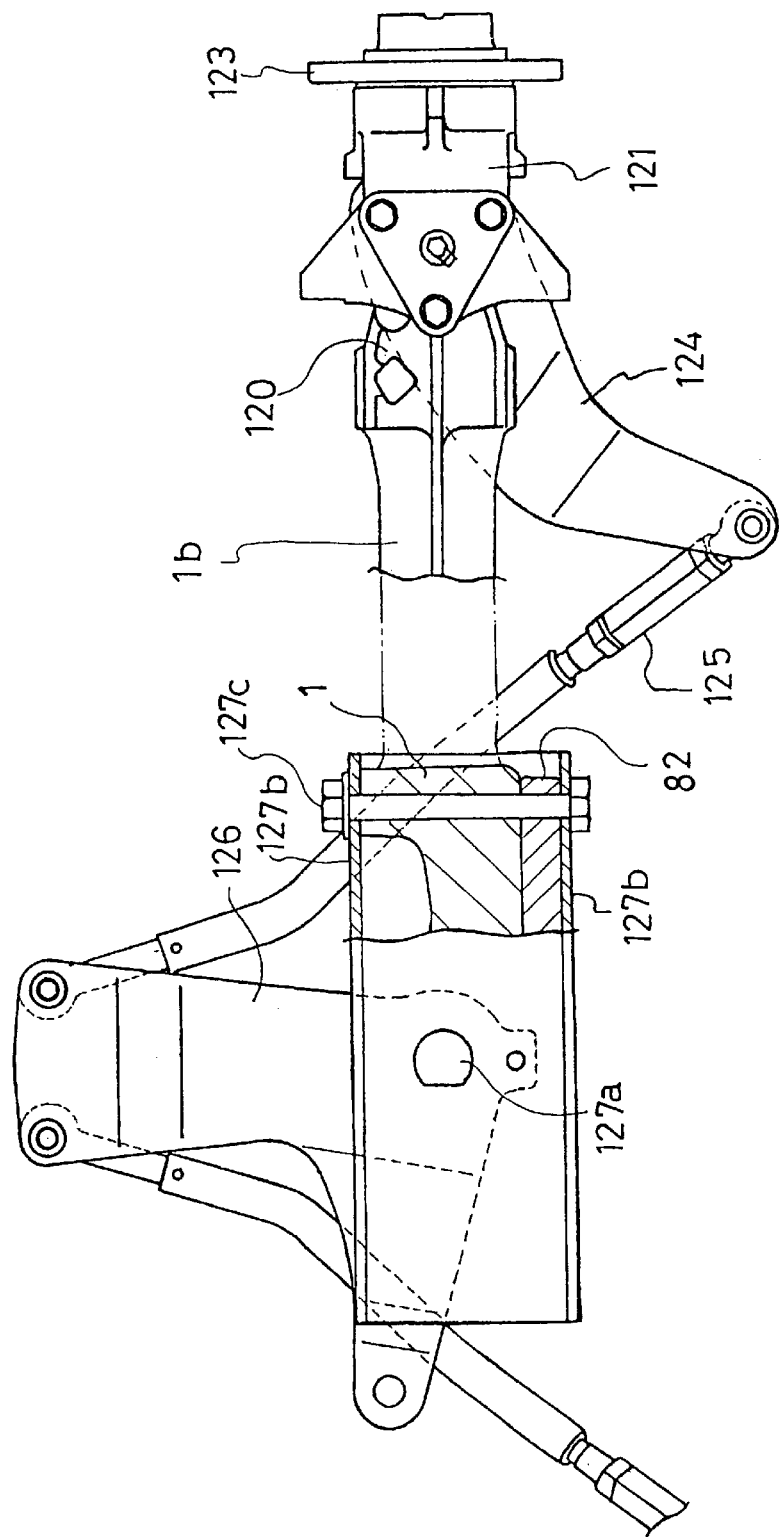
FIG. 15 is a plan view of a rear wheel steering portion of the present invention.

In another embodiment of the present invention, axle driving apparatus 103 may accommodate four-wheel-steering by providing outer end portions of axle housings 1b with steering mechanisms. As shown in FIGS. 14 and 15, a steering case 120 is fixed into an outer end surface of each axle housing 1b (only one axle housing 1b is shown). A rotatable case 121 is attached to each steering case 120 to rotate around a vertical axis. Rotatable case 121 is pivotally supported at the upper and lower surfaces thereof by steering case 120 with king pins 122. A wheel shaft 123 is rotatably supported by each rotatable case 121 and is fixed to a respective rear wheel 105.

A knuckle arm 124 laterally projects toward the center of the vehicle body from the lower surface of each rotatable case 121 and pivotally connects a tie rod 125. Both tie rods 125 are pivotally joined to one end of a bell crank arm 126.

A center pin 127a is mounted on a bracket 127 which is fixed to a lower surface of the housing. A center of bell crank arm 126 pivots about a center pin 127a. The other end of bell crank arm is operably connected to a handle of a front-wheel-steering mechanism through linkages and other suitable means.

The front and rear ends of bracket 127 extend upwardly forming a pair of front and rear attaching portions 127b. The joint surfaces of front and middle housing members 1 and 2 are sandwiched together between attaching portions 127b whereby bracket 127 forms the bottom of the housing.

The utmost end of axle 7L interconnects wheel shaft 123 through a universal joint 128. Likewise, a steering mechanism (not shown) similar to the above-mentioned is disposed at the end portion of axle housing 1b including axle 7R.

The housing of axle driving apparatus 103 is laterally narrow because hydraulic pump P and motor M are vertically disposed with respect to each other and are disposed above axle 7L. There is sufficient space for steering rotation of rear wheels 105 even when such steering mechanisms are disposed at the ends of axle housings 1b. Axle driving apparatus 103 has sufficient space to easily accommodate the addition of four-wheel-steering mechanisms because of the laterally narrow housing.

Figure 4:
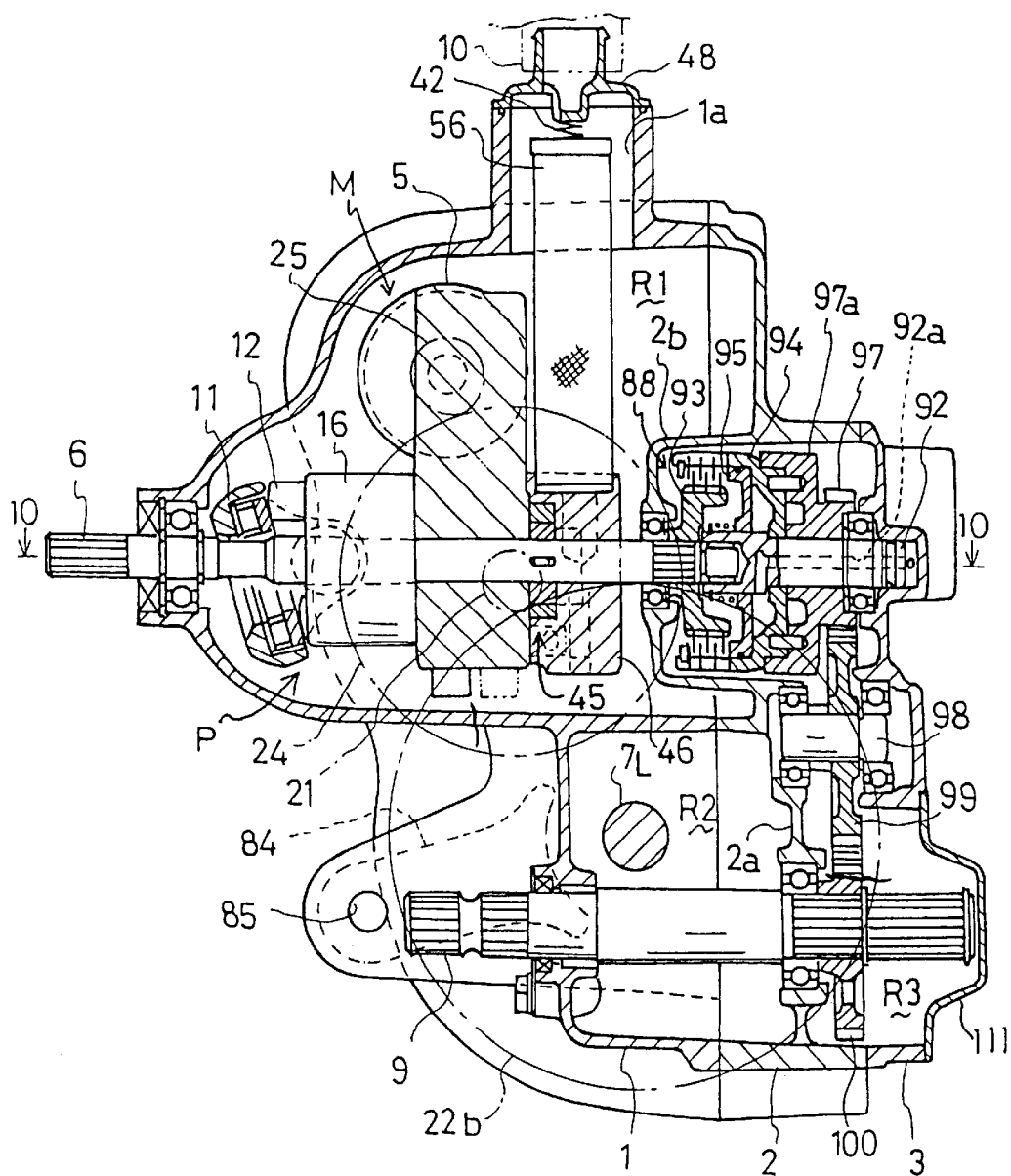
FIG. 4 is a sectional view taken along line 4—4 in FIG. 3.
Figure 11:
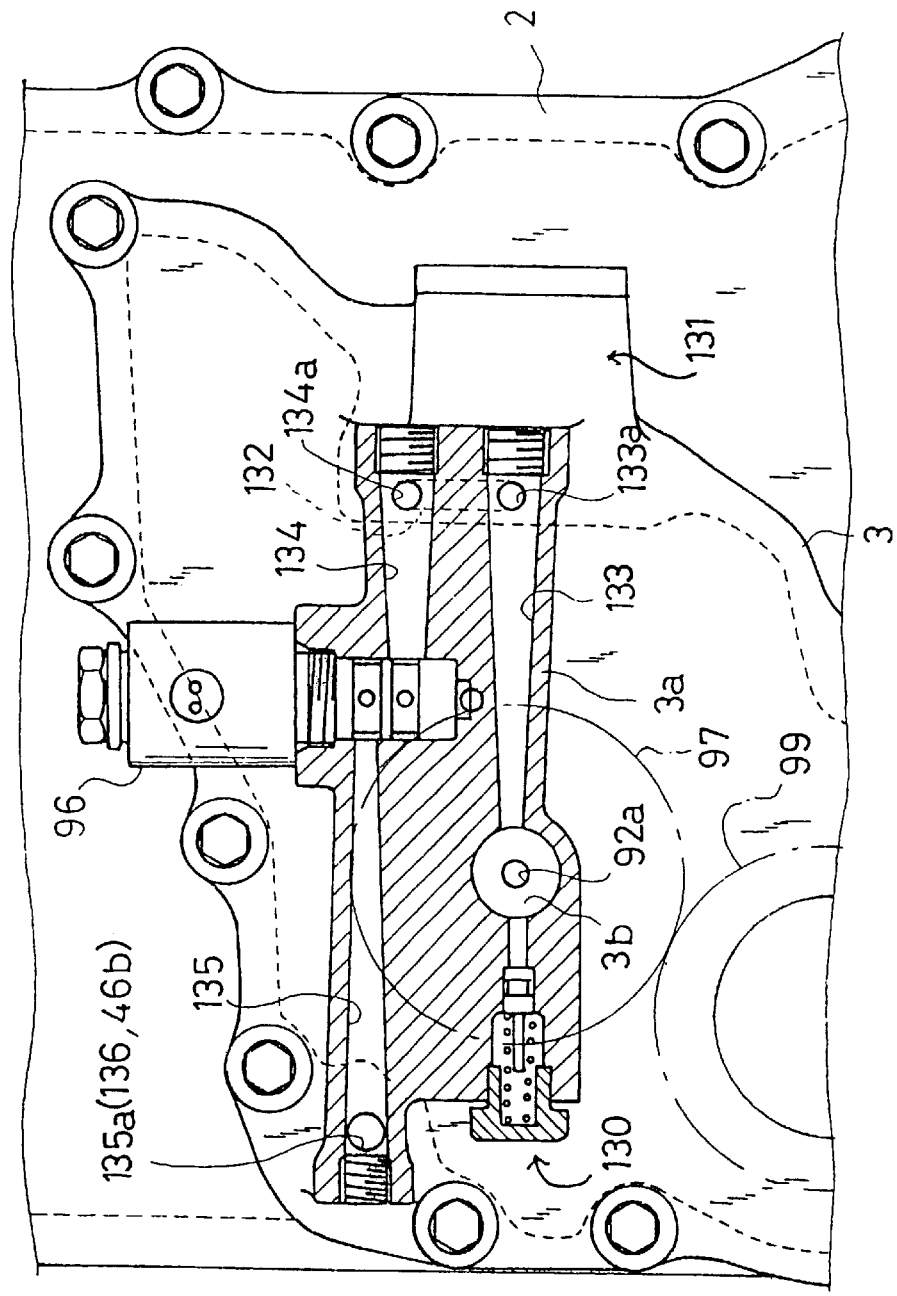
FIG. 11 is a sectional view taken along line 11—11 in FIG. 10.

Next, explanation will be given on a transmitting mechanism for a PTO shaft. As shown in FIGS. 4, 10 and 11, a rear end of input shaft 6 is inserted into third chamber R3 through recessed portion 2b. One end of a PTO input shaft 92 is rotatably supported by a bearing adjacent to and coaxial with the inner end of input shaft 6. A PTO clutch 88 having an oil operated clutch is disposed between PTO input shaft 92 and input shaft 6.

A rotary member 93 is spline-fitted on the end of input shaft 6. Friction plates are engaged with a periphery of rotary plate 93. A clutch case 94 is fixed onto the end portion of PTO input shaft 92. A piston 95 is included in clutch case 94. A portion of piston 95 opposite to rotary member 93 engages alternating friction plates. PTO clutch 88 is included in recessed portion 2b and can be activated by the operation of an electromagnetic valve 96 disposed outside of the housing.

Electromagnetic valve 96 can be turned ON and OFF by a PTO control means (not shown). As shown in FIGS. 4, 10 and 11, a cylindrical chamber is formed in clutch case 94 for sliding piston 95. The cylindrical chamber communicates with an oil passage 92a bored through PTO clutch shaft 92 between the end surface and along the axis thereof. A rear end of PTO clutch shaft 92 is slidably inserted into a hole 3b formed in rear wall 3a to form a rotary joint. Oil passage 92a opens to an oil chamber in hole 3b. Electromagnetic valve 96 is disposed on an upper surface of rear wall 3a of rear housing member 3. A switching valve portion of electromagnetic valve 96 is inserted into rear wall 3a.

An oil passage 135 is horizontally bored in rear wall 3a to one lateral side of the switching valve portion. Oil passage 135 is connected with an input port of the switching valve portion. Another oil passage 134 is horizontally bored to the other side of the switching valve portion of electromagnetic valve 96. Oil passage 134 is connected with output port of the switching valve portion. As shown in FIG. 10, the entrance end portion 135a of oil passage 135 extends perpendicularly therefrom. Entrance end portion 135a opens to a joint surface joined with the rear end of middle housing member 2. Entrance end portion 135a is thereby fluidly connected to opening portion 46b at the rear surface of charge pump case 46 through an oil passage 136 which is longitudinally bored in a thick wall of recessed portion 2b of middle housing member 2.

An oil passage 133 is bored parallel to and below oil passage 134 to connect with the oil chamber in hole 3b. Entrance end portions 134a and 133a of both oil passages 134 and 133 extend perpendicularly to open to the joint surface joined with a rear end of middle housing member 2. Entrance end portions 134a and 133a are mutually connected with each other through a vertically extending oil groove 132 recessed on the joint surface. In rear wall 3a of rear housing member 3 is disposed a relief valve 130 for setting the operating oil pressure of PTO clutch 88, whereby oil relieved from relief valve 130 returns to third camber R3.

A rotary prevention brake 131 is disposed adjacent to PTO clutch 88 on a side surface of middle housing member 2. Rotary prevention brake 131 includes a brake pad 131b fixed onto the utmost end of piston 131a. Gear 97 is affixed to a back surface of clutch case 94. Brake pad 131b is biased against a peripheral surface 97a of a large diametric boss portion of gear 97. Brake pad 131b is biased by a spring 131c to abut against peripheral surface 97a of the large diametric boss portion of gear 97. Piston 13 1a is disposed in cylindrical chamber 2c which is formed in a side surface portion of middle housing member 2.

Also, cylindrical chamber 2c communicates with an entrance end of an oil passage 133b. Oil passage 133b extends longitudinally through a side wall of middle housing member 2. Oil passage 133b communicates with oil passage 133a at the joint surface of middle housing member 2 when joined to the front surface of rear housing member 3. Rotary prevention brake 131 is of the negative-brake type and it is applied and released simultaneously with activation and deactivation of PTO clutch 88.

In accordance with the present invention, unless the PTO control means is operated, electromagnetic valve 96 is not activated and remains in the position shown in FIG. 8. Thus, pressure oil is not charged to PTO clutch 88 and rotary prevention brake 131. Accordingly, brake pad 131b is pressed against clutch case 94 thereby preventing PTO clutch shaft 92 from rotating.

When the PTO control means is operated, electromagnetic valve 96 is activated (the left position shown in FIG. 8) interconnecting oil passages 135 and 134. Thus, pressure oil from oil output port 46b is charged to both rotary prevention brake 131 and PTO clutch 88. Pressure oil disengages brake pad 131b from gear 97 and opens clutch case 94 thereby releasing rotary prevention brake 131. Accordingly, piston 95 of PTO clutch 88 slides and presses against the friction plates to move PTO clutch 88 inward. Thus, driving power from input shaft 6 is transmitted to PTO clutch shaft 92.

As shown in FIGS. 4 and 10, gear 97 disposed on PTO clutch shaft 92 rotates with clutch case 94. Gear 97 engages a gear 99 fixed on counter shaft 98. Gear 99 engages a gear 100 fixed on mid-PTO shaft 9. When PTO clutch 88 is moved inward driving power is transmitted to mid-PTO shaft 9 through gears 97, 99 and 100. The driving power from mid-PTO shaft 9 is transmitted to mower 106 through universal joints and transmitting shaft 108. Furthermore, when cover 111 is removed a working machine disposed at rear of the vehicle may receive driving power.

The transmitting mechanism between PTO clutch shaft 92 and mid-PTO shaft 9 may include a gear train of plane gears. The transmitting means between motor shaft 4 and differential input gear 22 may also include a gear train of plane gears. The narrow widths of the plane gears provide a compact design. Also, the transmitting mechanism to mid-PTO shaft 9 and differential input gear 22 overlap each other when viewed from the side thereby providing a narrow construction.

Furthermore, the direction of power transmission may optionally be changed between a mid-working machine and a rear-working machine. Removal of cover 111 from rear housing member 3 opens hole 3b. Removal of gear 100 from mid-PTO shaft 9 allows the attachment of a PTO gearcase 140. Thus, axle driving apparatus 103 can be optionally retro-fitted in order to change the direction of power transmission.

Longitudinally separable PTO gearcase 140 longitudinally and rotatably supports a rear-PTO input shaft 141, a counter shaft 142 and a rear-PTO output shaft 143 in parallel with each other. A gear 144 is fixed onto rear-PTO input shaft 141 and engages a gear 145 fixed onto counter shaft 142. A gear 146 is also fixed onto counter shaft 142 and engages a gear 147 fixed onto rear-PTO shaft 143. Thus, driving power can be transmitted from rear-PTO input shaft 141 to rear-PTO output shaft 143.

A tubular rotary member 148 is spline-fitted through-hole 3b on the rear end portion of mid-PTO shaft 9. A gear 149 rotatably engages a periphery of rotary member 148 through a bearing. Gear 149 has a pair of toothed portions 149a and 149b. Toothed portion 149a engages gear 99 on counter shaft 98. The other toothed portion 149b is disposed on the same axis of toothed portion 148a and is formed on an end portion of rotary member 148. Another toothed portion 144a is formed on an end portion of gear 144. A clutch slider 150 is disposed outwardly to respectively engage with toothed portions 144a, 148a and 149b.

Clutch slider 150 engages with a slide fork 151, which is slidably supported on a fork shaft 152 fixed in PTO gearcase 140. Slide fork 151 slides in response to the rotation of an arm 154 and a shifting shaft 153 supported by a side wall of gearcase 140. Shifting shaft 153 is interconnected with a PTO shifting operating lever adjacent to a vehicle operator's seat by linkages and other suitable means. The shift position of slide fork 151 is detected by sensors 155 and 156.

Figure 16:
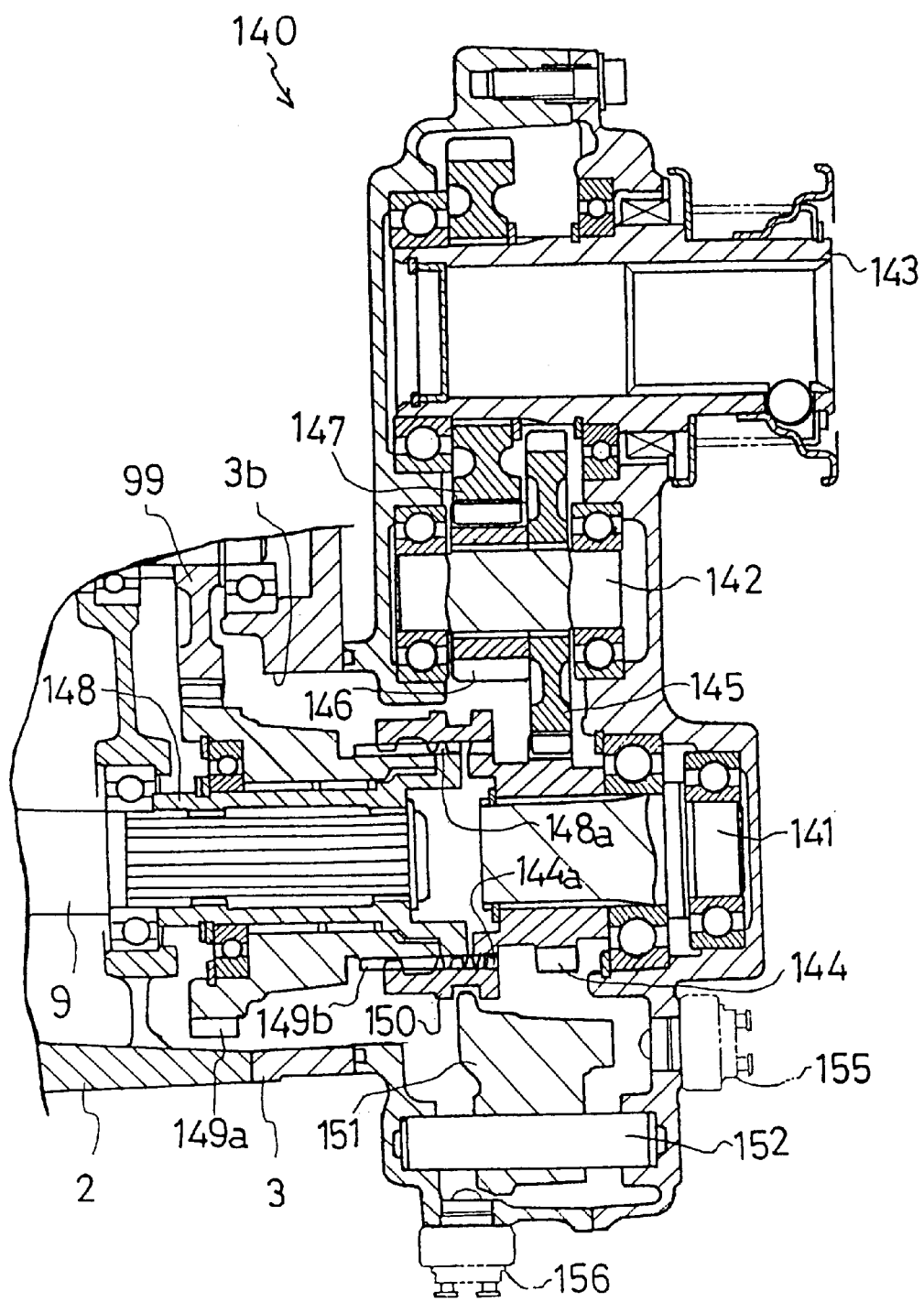
FIG. 16 is a sectional side view of a PTO switching gearcase of the present invention.
Figure 17:
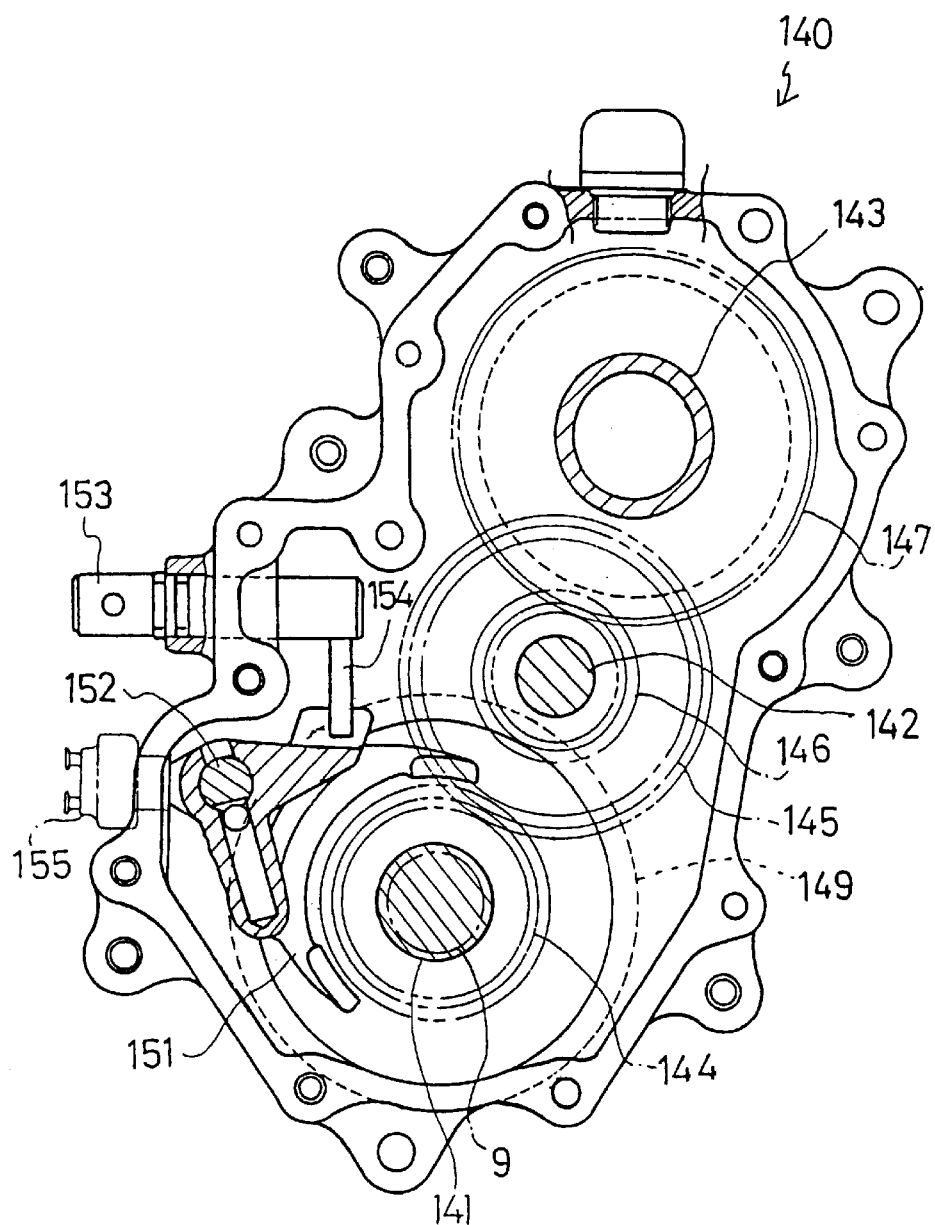
FIG. 17 is a front view of the PTO switching gearcase.
Figure 18:
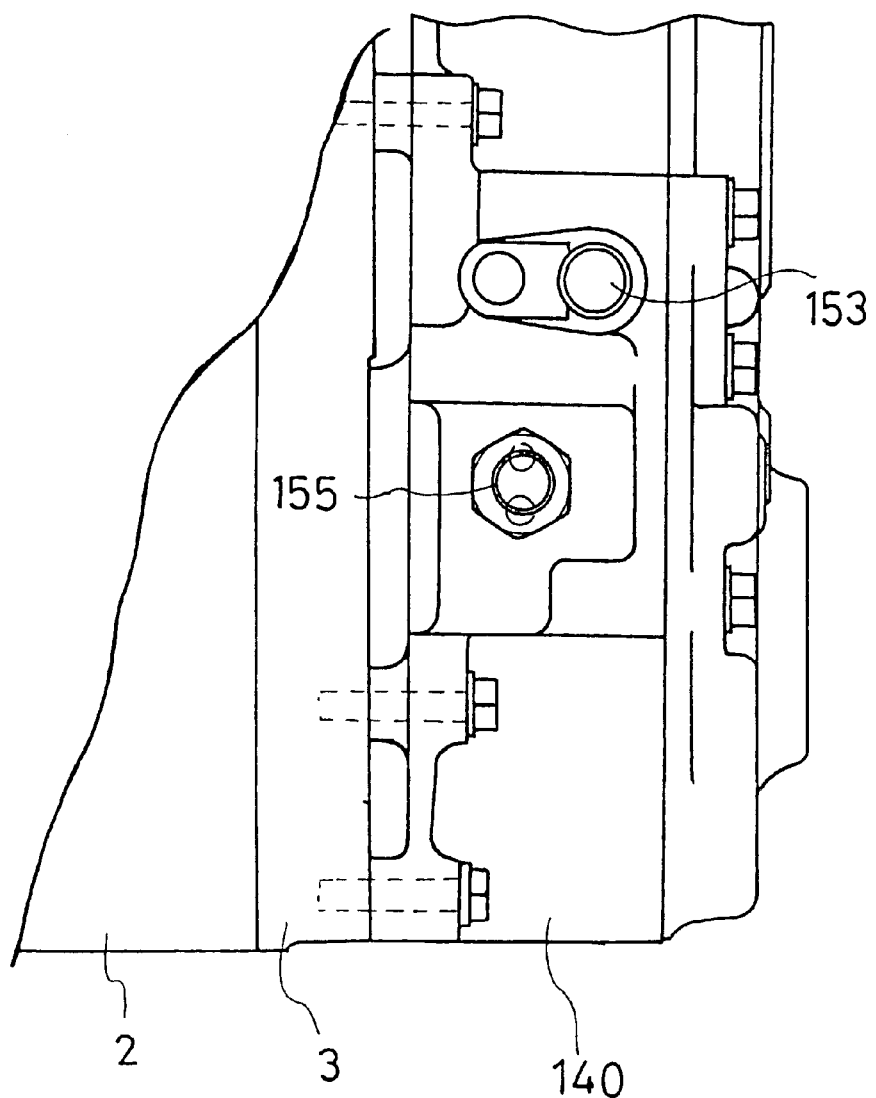
FIG. 18 is a side view of the PTO switching gearcase.

Thus, referring to FIG. 16, when clutch slider 150 is positioned to the left by rotation of shifting shaft 153, toothed portions 149b and 148a engage clutch slider 150 whereby driving power is transmitted from gear 149 only to mid-PTO shaft 9, thereby driving only the mid-working machine. When slider 150 is positioned in a middle position, as shown in FIG. 8, it engages all of toothed portions 144a, 148a and 149b and thereby drives both mid-PTO and rear-PTO working machines. Also, when clutch slider is positioned to the right, it engages only toothed portions 144a and 148a whereby driving power is transmitted to only rear-PTO shaft 143 and thereby drives only the rear-working machine.

When PTO gearcase is used, PTO gearcase 140 covers hole 3b, which is formed in the rear wall of rear housing member 3 for insertion and removal of gears, instead of cover 111. Thus, the driving power from PTO clutch 88 disposed in third chamber R3 is transmitted to PTO gearcase 140 through-hole 3b, thereby providing driving power to both mid-PTO shaft 9 and rear-PTO shaft 143.

According to one aspect of the present invention, an axle driving apparatus includes a housing which houses an input shaft, an HST, a pair of left and right axles and a first transmitting mechanism drivingly interconnecting the HST and the axles, particularly a differential gearing differentially connecting inner portions of the axles.

The axle driving apparatus according to this aspect of the present invention may include a PTO shaft in addition to the above-mentioned members included in the housing. The housing includes at least two housing members longitudinally joined with each other. The HST driven by the input shaft and the first transmitting mechanism drivingly connecting the input shaft with the axles are disposed in one longitudinal side of the housing. A second transmitting means drivingly connecting the input shaft with the PTO shaft is separately disposed in the other longitudinal side of the housing. A center section of the HST may be disposed in the housing to prevent oil leakage of the axle driving apparatus. A PTO system may be integrally disposed to reduce the number of housing members constructing the housing.

In one embodiment of the present invention, the housing includes front, middle and rear housing members longitudinally joined with one another. First and second chambers are formed between the front and middle housing members and a third chamber is formed between the middle and rear housing members. An HST driven by the input shaft is disposed in one of the first or third chambers. A first transmitting mechanism drivingly connecting the HST and the axles is disposed in the second chamber. A transmitting mechanism drivingly connecting the input shaft and the PTO shaft is disposed in the other of the third or first chambers. This embodiment of the present invention also has all of the above mentioned advantages.

With the above arrangement of the axle driving apparatus includes the HST, the first transmitting mechanism for driving the axles, the second transmitting means for driving the PTO shaft, wherein the axis of rotation of hydraulic pump is substantially coincident with that of input shaft and perpendicular to the axis of rotation of hydraulic motor, and wherein the hydraulic pump and motor are vertically disposed of one another and above the axles. Such an arrangement provides a narrow housing having a small lateral width and a compact design. This compact design allows space for the rotation of steerable rear wheels in the case of four wheel steering. Also, because the input shaft connects directly to the hydraulic pump, and because the hydraulic motor and the axles are interconnected by a gear train of plane gears, the axle driving apparatus may be simply constructed at a low cost.

Furthermore, because of the arrangement of the hydraulic pump and motor of the HST, since the hydraulic pump is disposed between the hydraulic motor and the axles, any dead space to either side of a gear train between the hydraulic motor and the axles is eliminated thereby reducing the vertical length of the housing.

According to another aspect of the present invention, the PTO shaft is disposed adjacent the axles, and both the transmitting means for driving the axles and the transmitting means for driving the PTO shaft overlap each other when viewed from one side. This arrangement reduces the longitudinal length of the housing and further compacts the axle driving apparatus.

In the case that the housing includes front, middle and rear housing members longitudinally joined with each other forming first, second and third chambers therein, lubricating oil may be supplied to both the first transmitting means driving the axles and to the second transmitting means driving the PTO shaft because the respective chambers are fluidly connected.

Since the chamber containing the HST is fluidly connected with the second chamber through an oil filter, the oil supplied to the HST remains clean. Filtering out foreign matter from the lubricating oil improves in durability.

Also, since the transmitting means for driving the PTO shaft includes an oil clutch for drivingly engaging and disengaging the PTO shaft from the input shaft, and the charge pump is disposed within the housing for supplying the oil clutch with operating oil, the charge pump is disposed adjacent the oil clutch. This arrangement shortens the oil passages between the input shaft and the oil clutch to reduce the resistivity of oil passages and thereby reducing the loss of driving power. Furthermore, since the pressure oil discharged from the charge pump is partly supplied to the HST as operating oil, the charge pump can be used both for the oil clutch and for the HST. The number of hydraulic pumps in addition to the driving pump can be reduced thereby reducing the cost of the axle driving apparatus.

Also, in the case of four-wheel-steering, the axle housings are integrally formed by one of the housing members of the above described narrow housing and a steering case is attached to each end of a respective axle housing. Rear wheel track is minimized thereby reducing the rotational steering diameter of the vehicle. This improves steering and operating properties of the vehicle.

The oil filter and the HST of the present invention are disposed in an oil sump formed by the housing and the reserve tank regulates the volume of oil in the oil sump. The oil filtered through the oil filter is drawn into the HST as operating oil. A large opening for insertion and removal of the oil filter is disposed on the upper surface of the housing. A cover is provided to close the opening whereby the oil filter can be inserted or removed only upon removal of the cover. The oil filter is disposed adjacent to the upper surface of the housing and is inserted and removed vertically. Accordingly, the oil filter is easily installed and removed as it is free of obstacles. Also, since the oil filter is disposed at an upper portion in the housing, the HST draws rather pure oil which increases the expected life span of the HST and reduces the number of oil filter changes.

The cover includes a connecting portion for coupling with the reserve tank whereby piping for the reserve tank is not required. This reduces the number of parts and simplifies the construction of the axle driving apparatus.

Furthermore, since the input port of the HST which is connected with the oil filter opens upwardly in the oil sump, the air in the oil sump is naturally removed. Unlike horizontally disposed oil filters, the vertically disposed oil filter of the present invention is vertically inserted into the upward opening input port of the center charge pump case. Thus a guide member is unnecessary and installation of the oil filter into the input port is simplified.

Although a conventional differential gearing without a differential casing has a lower cost advantage, a differential input gear of such a conventional differential gearing easily bends under heavy tractional loads because it is not sufficiently supported. Thus, there is room for improvement in durability of such a conventional differential gearing. On the other hand, the differential gearing according to the present invention engages with at least one of the inner facing portions of the axles, includes a plurality of through-holes bored therein at regular intervals, rotatably supports bevel pinions substantially perpendicularly to the axes of axles respectively, includes differential side gears fitted on the left and right axles respectively, includes a support member having a recessed portion receiving one of the differential side gears disposed on one of the axles, includes a fixed portion fixedly connected with the differential input gear, and includes a bearing portion journalled by the housing. This construction prevents bending or tilting of the differential gear, provides a simple differential gearing having fewer parts, and improves the durability thereof.

Since the differential input gear includes a main body provided with through-holes and a gearing portion separably attached on a periphery of the main body, the main body may be constructed of sintered alloy or other suitable materials which allow easy fabrication of the through-holes, and the gearing portion may be constructed of steel or other suitable materials which have an advantage in strength. Accordingly, each part may be formed of a material suitable for that part thereby reducing the cost of the differential gearing.

Also, since the support member includes an engaging projection that rotates with and is axially slidable with the support member, the differential gearing can be easily converted to the differential-lock type with the addition of a differential control means for operably shifting the engaging projection.

What is claimed is:

1. An axle driving apparatus comprising:

an input shaft having an axis of rotation;

an axle having, an axis of rotation perpendicular to said axis of rotation of said input shaft;

a housing for housing said input shaft and said axle;

an oil chamber formed in said housing;

an oil filter and an hydrostatic transmission disposed in said oil chamber, wherein said hydrostatic transmission draws oil filtered through said oil filter as operating oil; and an opening disposed in an upper surface of said housing, said opening being sufficiently large to allow installation and removal of said oil filter therethrough; and a cover for closing said opening.

2. An axle driving apparatus according to claim 1, wherein said cover includes a connecting portion for connection to a reserve tank for regulation of the volume of oil in said oil chamber.

3. An axle driving apparatus according to claim 1, wherein an input port of said hydrostatic transmission is connected with said oil filter and opens upwardly in said oil chamber.

4. An axle driving apparatus according to claim 2, wherein said reserve tank includes an upper lid having a breather.

5. An axle driving apparatus according to claim 2, wherein said oil filter is disposed below said reserve tank.

6. An axle driving apparatus according to claim 1, wherein said axle driving apparatus is mounted on a vehicle, and said opening is disposed under a seat of the vehicle.

7. An axle driving apparatus according to claim 1, wherein said oil filter is not directly in contact with said housing.

8. An axle driving apparatus according to claim 1, wherein said cover includes a mounting flange.

9. An axle driving apparatus according to claim 1, wherein said oil filter is biased away from said cover by a spring.

10. An axle driving apparatus comprising:

an input shaft having an axis of rotation;

an axle having an axis of rotation perpendicular to said axis of rotation of said input shaft;

a housing for housing said input shaft and said axle;

an oil sump formed in said housing;

an oil filter and an hydrostatic transmission disposed in said oil sump, wherein said hydrostatic transmission draws oil filtered through said oil filter as operating oil;

an opening disposed in an upper surface of said housing, said opening being sufficiently large to allow installation and removal of said oil filter therethrough; and a cover for closing said opening, wherein said cover includes a connecting portion for connection to a reserve tank for regulation of the volume of oil in said oil sump.

11. An axle driving apparatus according to claim 10, wherein said reserve tank includes an upper lid having a breather.

12. An axle driving apparatus according to claim 10, wherein said axle driving apparatus is mounted on a vehicle, and said opening is disposed under a seat of the vehicle.

13. An axle driving apparatus according to claim 10, wherein said oil filter is disposed below said reserve tank.

14. An axle driving apparatus according to claim 10, wherein said oil filter is biased away from said cover by a spring.

15. An axle driving apparatus according to claim 10, wherein said oil filter is not directly in contact with said housing.

16. An axle driving apparatus according to claim 10, wherein said cover includes a mounting flange.

17. An axle driving apparatus comprising:

an input shaft having an axis of rotation;

an axle having an axis of rotation perpendicular to said axis of rotation of said input shaft;

a housing for housing said input shaft and said axle;

an oil sump formed in said housing;

an oil filter and an hydrostatic transmission disposed in said oil sump, wherein said hydrostatic transmission draws oil filtered through said oil filter as operating oil, and wherein an input port of said hydrostatic transmission is connected with said oil filter and opens upwardly in said oil sump;

an opening disposed in an upper surface of said housing, said opening being sufficiently large to allow installation and removal of said oil filter therethrough; and a cover for closing said opening.

18. An axle driving apparatus according to claim 17, wherein said axle driving apparatus is mounted on a vehicle, and said opening is disposed under a seat of the vehicle.

19. An axle driving apparatus according to claim 17, wherein said oil filter is biased away from said cover by a spring.

20. An axle driving apparatus according to claim 17, wherein said oil filter is not directly in contact with said housing.

21. An axle driving apparatus according to claim 17, wherein said cover includes a mounting flange.

* * * * *